(12) United States Patent
Kim et al.

(10) Patent No.: US 12,474,809 B2
(45) Date of Patent: Nov. 18, 2025

(54) DISPLAY DEVICE AND DISPLAY PANEL

(71) Applicant: LG Display Co., Ltd., Seoul (KR)

(72) Inventors: SungChul Kim, Paju-si (KR); DeukSu Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/738,648

(22) Filed: Jun. 10, 2024

(65) Prior Publication Data

US 2025/0004601 A1    Jan. 2, 2025

(30) Foreign Application Priority Data

Jun. 28, 2023    (KR) ........................ 10-2023-0083694

(51) Int. Cl.
*G06F 3/044*    (2006.01)
*G06F 3/041*    (2006.01)
*H10K 59/40*   (2023.01)

(52) U.S. Cl.
CPC ........ *G06F 3/0446* (2019.05); *G06F 3/04164* (2019.05); *G06F 3/0443* (2019.05); *H10K 59/40* (2023.02)

(58) Field of Classification Search
CPC .. G06F 3/0446; G06F 3/04164; G06F 3/0443; G06F 2203/04111; G06F 3/0412;
(Continued)

(56) References Cited

U.S. PATENT DOCUMENTS 10,175,836 B2 *   1/2019   Makino ................. G06F 3/0443
11,500,501 B2 *  11/2022   Lee ....................... G06F 3/0448
(Continued)

FOREIGN PATENT DOCUMENTS

CN    205318347 U    6/2016
JP    2019-220165 A   12/2019
(Continued)

OTHER PUBLICATIONS

Intellectual Property Office of the United Kingdom, Combined Search and Examination Report, United Kingdom Patent Application No. GB2409325.4, Dec. 5, 2024, seven pages.
(Continued)

*Primary Examiner* — Amy Onyekaba
(74) *Attorney, Agent, or Firm* — Fenwick & West LLP

(57) ABSTRACT

A display device and a display panel may comprise a substrate comprising a display area including a plurality of subpixels and a non-display area including a pad area spaced apart from the display area in a first direction, a first sensor electrode in the display area and extending in a second direction crossing the first direction, a second sensor electrode in the display area and extending in the second direction, a first pad in the pad area, a second pad in the pad area, a first trace line electrically connecting the first sensor electrode and the first pad and a second trace line electrically connecting the second sensor electrode and the second pad. The second sensor electrode may be positioned closer to the pad area than the first sensor electrode. The first trace line overlaps the second sensor electrode, and the second trace line may include a first meandering portion.

18 Claims, 19 Drawing Sheets

(58) Field of Classification Search
CPC ......... G06F 2203/04112; G06F 1/1643; G06F 1/169; G06F 3/0488; G06F 3/044; G06F 3/047; H10K 59/40; H10K 59/131; H10K 59/82; H10K 59/873
See application file for complete search history.

(56) References Cited

U.S. PATENT DOCUMENTS

| | | | |
|---|---|---|---|
| 11,579,728 B2 | 2/2023 | Kim et al. | |
| 11,803,283 B2* | 10/2023 | Lee | G06F 3/0412 |
| 2014/0063375 A1* | 3/2014 | Kuriki | G06F 1/1692 |
| | | | 174/253 |
| 2015/0277635 A1* | 10/2015 | Kim | G06F 3/047 |
| | | | 345/173 |
| 2016/0172428 A1* | 6/2016 | Song | H10K 59/131 |
| | | | 257/40 |
| 2016/0174304 A1* | 6/2016 | Kim | H10K 59/8792 |
| 2017/0097703 A1* | 4/2017 | Lee | G06F 3/0443 |
| 2017/0097727 A1 | 4/2017 | Wu et al. | |
| 2018/0059843 A1 | 3/2018 | Kim | |
| 2018/0308903 A1 | 10/2018 | Jeong et al. | |
| 2019/0079633 A1 | 3/2019 | Kim et al. | |
| 2019/0129567 A1* | 5/2019 | Rhe | G06F 3/0443 |
| 2019/0171315 A1* | 6/2019 | Park | G06F 3/0445 |
| 2019/0265820 A1* | 8/2019 | Li | H01L 24/42 |
| 2019/0384451 A1 | 12/2019 | Hu | |
| 2020/0333937 A1* | 10/2020 | Motonishi | H01R 12/65 |
| 2021/0004126 A1* | 1/2021 | Jang | G06F 3/0412 |
| 2021/0026479 A1 | 1/2021 | Lee et al. | |
| 2021/0247866 A1* | 8/2021 | Kim | G06F 3/04164 |
| 2022/0206663 A1 | 6/2022 | Kim et al. | |
| 2022/0320259 A1* | 10/2022 | Sano | H10K 77/111 |

FOREIGN PATENT DOCUMENTS

| | | |
|---|---|---|
| JP | 2021-103459 A | 7/2021 |
| JP | 2022-104559 A | 7/2022 |

OTHER PUBLICATIONS

Japan Patent Office, Notice of Allowance, Japanese Patent Application No. 2024-104417, Mar. 18, 2025, five pages.

* cited by examiner

DISPLAY DEVICE AND DISPLAY PANEL

CROSS-REFERENCE TO RELATED APPLICATION

This application claims priority from Republic of Korea Patent Application No. 10-2023-0083694, filed on Jun. 28, 2023, which is hereby incorporated by reference in its entirety.

BACKGROUND

Field

Embodiments of the disclosure relate to a display device and a display panel.

Description of Related Art

As the information society develops, demand for display devices for displaying images is increasing in various forms. Various display devices, such as liquid crystal display devices and organic light emitting display devices, are being utilized. Among others, touch display devices provide an input scheme that allows users easier and more intuitive and convenient entry of information or commands without the need for buttons, a keyboard, a mouse, or other typical input means.

For various reasons, such as aesthetics and product application, vigorous research and development efforts are recently being conducted to reduce the size of the bezel (non-display area). However, there are significant limitations in reducing the size of the bezel due to inevitable placement of various components (e.g., various lines or patterns) in the bezel.

SUMMARY

Embodiments of the disclosure may provide a display device and a display panel having a touch sensor structure that allows for a narrow bezel.

Embodiments of the disclosure may provide a display device and a display panel including a touch sensor that may provide high touch sensitivity while having a narrow bezel.

Embodiments of the disclosure may provide a display device and a display panel including a touch sensor that may reduce noise between sensor electrodes.

In one embodiment, a display panel comprises: a substrate comprising a display area including a plurality of subpixels and a non-display area including a pad area spaced apart from the display area in a first direction; first to third sensor electrodes arranged in the display area such that the second sensor electrode is closer to the pad area than the first sensor electrode, each of the first to third sensor electrodes extending in a second direction that crosses the first direction; a fourth sensor electrode in the display area, the fourth sensor electrode extending along the first direction such that the fourth sensor electrode crosses the first to third sensor electrodes; first to fourth pads in the pad area; a first trace line electrically connecting the first sensor electrode and the first pad, the first trace line overlapping the second sensor electrode; a second trace line electrically connecting the second sensor electrode and the second pad, the second trace line including a first meandering portion having at least one part that extends in the first direction and at least one part extends in the second direction in the display area; a third trace line electrically connecting the third sensor electrode and the third pad; and a fourth trace line electrically connecting the fourth sensor electrode and the fourth pad.

In one embodiment, a display panel comprises: a substrate comprising a display area including a plurality of subpixels and a non-display area including a pad area that is spaced apart from the display area in a first direction; a light emitting element in the display area of the substrate; an encapsulation layer on the light emitting element; first to third sensor electrodes on the encapsulation layer in the display area, each the first to third sensor electrodes extending in a second direction that crosses the first direction; a fourth sensor electrode on the encapsulation layer in the display area, the fourth sensor electrode crossing the first to third sensor electrodes; first to fourth pads in the pad area; a first trace line extending across the display area in the first direction, the first trace line electrically connecting the first sensor electrode and the first pad; a second trace line extending across the display area in the first direction, the second trace line electrically connecting the second sensor electrode and the second pad; a third trace line extending across the display area in the first direction, the third trace line electrically connecting the third sensor electrode and the third pad; and a fourth trace line electrically connecting the fourth sensor electrode and the fourth pad, wherein the encapsulation layer includes a first inclined surface at a first part of the non-display area that is adjacent to a first side of the display area that extends in the second direction, a second inclined surface at a second part of the non-display area that is adjacent to a second side of the display area that extends in the first direction, a third inclined surface at a third part of the non-display area that is adjacent to a third side of the display area that extends in the second direction and is spaced apart from the first side of the display area in the first direction, and a fourth inclined surface at a fourth part of the non-display area that is adjacent to a fourth side of the display area that extends in the first direction and is spaced apart from the second side of the display area in the second direction, wherein metal is not disposed on the second inclined surface and the fourth inclined surface, and wherein the first trace line, the second trace line, the third trace line, and the fourth trace line overlap the first inclined surface without overlapping the second inclined surface, the third inclined surface, and the fourth inclined surface.

In one embodiment, a display panel comprises: a substrate comprising a display area including a plurality of subpixels and a non-display area including a pad area spaced apart from the display area in a first direction; a first sensor electrode in the display area, the first sensor electrode extending in a second direction that crosses the first direction; a second sensor electrode in the display area, the second sensor electrode extending in the second direction and is closer to the pad area than the first sensor electrode; a first trace line extending from the pad area to the first sensor electrode such that the first trace line overlaps the first sensor electrode and the second sensor electrode; and a second trace line extending from the pad area to the second sensor electrode such that the second trace line overlaps the second sensor electrode without overlapping the first sensor electrode, wherein a total length of the second trace line is substantially a same as a total length of the first trace line.

According to an embodiment of the disclosure, there may be provided a display device and a display panel having a touch sensor structure that allows for a narrow bezel.

According to an embodiment of the disclosure, there may be provided a display device and a display panel including a touch sensor that may provide high touch sensitivity while having a narrow bezel.

According to an embodiment of the disclosure, there may be provided a display device and a display panel including a touch sensor that may reduce noise between sensor electrodes.

According to embodiments of the disclosure, as the bezel size is significantly reduced, the use of materials corresponding to the reduced bezel size may be reduced. This may help reduce the weight of the display device.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Hereinafter, embodiments of the disclosure are described in detail with reference to the accompanying drawings. The same or substantially the same reference denotations are used to refer to the same or substantially the same elements throughout the specification and the drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a," "an," and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components is not limited by the denotations in light of order or sequence.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

When such terms as, e.g., "after", "next to", "after", and "before", are used to describe the temporal flow relationship related to components, operation methods, and fabricating methods, it may include a non-continuous relationship unless the term "immediately" or "directly" is used.

Meanwhile, if a numerical value or its corresponding information (e.g., level, etc.) is mentioned for a component, it may be interpreted that the numerical value or its corresponding information includes a margin of error that may be caused by various factors (e.g., process factors, internal or external shocks, noise, etc.), even if it is not explicitly stated otherwise.

Hereinafter, various embodiments of the disclosure are described in detail with reference to the accompanying drawings.

Figure 1:
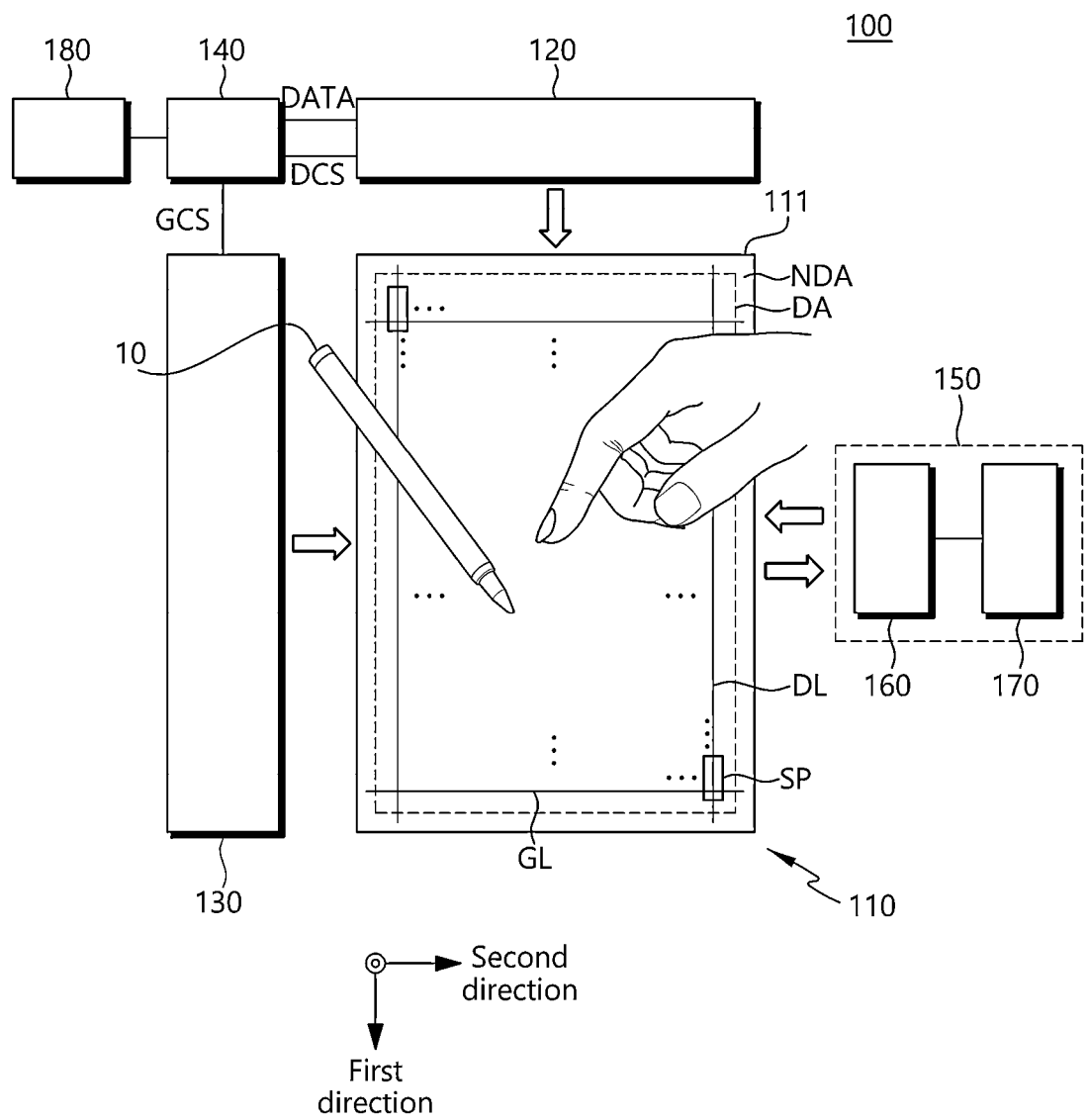
FIG. 1 is a view illustrating a system configuration of a display device according to embodiments of the disclosure.

FIG. 1 is a view illustrating a system configuration of a display device 100 according to embodiments of the disclosure.

Referring to FIG. 1, a display device 100 according to embodiments of the disclosure may include a display panel 110 and display driving circuits, as components for displaying images. The display driving circuits are circuits for driving the display panel 110 and may include a data driving circuit 120, a gate driving circuit 130, and a display controller 140.

The display panel 110 may include a substrate 111, a plurality of subpixels SP disposed on the substrate 111, and various signal lines disposed on the substrate 111 to drive the plurality of subpixels SP.

The substrate 111 may include a display area DA where the plurality of subpixels SP are disposed and a non-display area NDA positioned in a first direction from the display area DA.

The non-display area NDA may include a pad area for connection with the data driving circuit 120. For example, the pad area may be positioned in the first direction in the display area DA.

The non-display area NDA may only have as large a size as it may include, e.g., the pad area. In other words, the non-display area NDA of the display panel 110 according to embodiments of the disclosure may have a very small size. For example, although the display panel 110 has the non-display area NDA, the boundary area between the display area and the non-display area NDA may be bent, so that the non-display area NDA may be positioned under the display area DA. In this case, no or little change may be made to the non-display area NDA shown to the user when the user views the display area DA from the front.

The display device 100 according to embodiments of the disclosure may be a liquid crystal display device or a self-emission display device in which the display panel 110 emits light by itself. When the display device 100 according to the embodiments of the disclosure is a self-emission display device, each of the plurality of subpixels SP may include a light emitting element.

For example, the display device 100 according to embodiments of the disclosure may be an organic light emitting diode display in which the light emitting element is implemented as an organic light emitting diode (OLED). As another example, the display device 100 according to embodiments of the disclosure may be an inorganic light emitting display device in which the light emitting element is implemented as an inorganic material-based light emitting diode. As another example, the display device 100 according to embodiments of the disclosure may be a quantum dot display device in which the light emitting element is implemented as a quantum dot which is self-emission semiconductor crystal.

The structure of each of the plurality of subpixels SP may vary according to the type of the display device 100. For example, when the display device 100 is a self-emission display device in which the subpixels SP emit light by themselves, each subpixel SP may include a light emitting element that emits light by itself, one or more transistors, and one or more capacitors.

For example, various types of signal lines may include a plurality of data lines DL transferring data signals (also referred to as data voltages or image signals) and a plurality of gate lines GL transferring gate signals (also referred to as scan signals).

The plurality of data lines DL and the plurality of gate lines GL may cross each other. Each of the plurality of data lines DL may be disposed to extend in the first direction. Each of the plurality of gate lines GL may be disposed to extend in the second direction. Here, the first direction may be a column direction and the second direction may be a row direction. The first direction may be the row direction, and the second direction may be the column direction. For convenience of description, described below is an example in which each of the plurality of data lines DL is disposed in the column direction, and each of the plurality of gate lines GL is disposed in the row direction, and the first direction is the column direction, and the second direction is the row direction.

The data driving circuit 120 is a circuit for driving the plurality of data lines DL, and may out data signals to the plurality of data lines DL.

The data driving circuit 120 may receive digital image data DATA from the display controller 140 and may convert the received image data DATA into analog data signals and output them to the plurality of data lines DL.

For example, the data driving circuit 120 may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The data driving circuit 120 may be disposed outside the display area DA of the display panel 110, but alternatively, the data driving circuit 120 may be disposed in the display area DA of the display panel 110.

The gate driving circuit 130 is a circuit for driving the plurality of gate lines GL, and may output gate signals to the plurality of gate lines GL.

The gate driving circuit 130 may receive a first gate voltage corresponding to a turn-on level voltage and a second gate voltage corresponding to a turn-off level voltage, along with various gate driving control signals GCS, generate gate signals, and supply the generated gate signals to the plurality of gate lines GL.

In the display device 100 according to embodiments of the disclosure, the gate driving circuit 130 may be disposed to overlap the display area DA of the display panel 110. For example, the gate driving circuit 130 may be disposed throughout the display area DA or may be disposed only in a portion (e.g., two opposite sides) of the display area DA. When the gate driving circuit 130 is disposed to overlap the display area DA, the gate driving circuit 130 may be disposed not to overlap the subpixels SP or may be disposed to overlap all or some of the subpixels SP.

In the display device 100 according to embodiments of the disclosure, the gate driving circuit 130 may be embedded, in a gate in panel (GIP) type, in the display panel 110. When the gate driving circuit 130 is of the gate in panel type, the gate driving circuit 130 may be formed on the substrate 111 of the display panel 110 during the manufacturing process of the display panel 110.

The display controller 140 is a device for controlling the data driving circuit 120 and the gate driving circuit 130 and may control driving timings for the plurality of data lines DL and driving timings for the plurality of gate lines GL.

The display controller 140 may supply a data driving control signal DCS to the data driving circuit 120 to control data driving and may supply a gate driving control signal GCS to the gate driving circuit 130 to control gate driving.

The display controller 140 may receive input image data from the host system 180 and supply image data DATA to the data driving circuit 120 based on the input image data.

The display controller 140 may be implemented as a separate component from the data driving circuit 120, or the display controller 140 and the data driving circuit 120 may be integrated into an integrated circuit (IC).

The display controller 140 may be a timing controller used in typical display technology, a control device that may perform other control functions as well as the functions of the timing controller, or a control device other than the timing controller, or may be a circuit in the control device. The display controller 140 may be implemented as various circuits or electronic components, such as an integrated circuit (IC), a field programmable gate array (FPGA), an application specific integrated circuit (ASIC), or a processor.

The display controller 140 may be mounted on a printed circuit board or a flexible printed circuit and may be electrically connected with the data driving circuit 120 and the gate driving circuit 130 through the printed circuit board or the flexible printed circuit.

The display controller 140 may transmit/receive signals to/from the data driving circuit 120 according to one or more predetermined interfaces. The interface may include, e.g., a low voltage differential signaling (LVDS) interface, an embedded clock point-point interface (EPI), and a serial peripheral interface (SPI).

Meanwhile, the display device 100 according to embodiments of the disclosure may include a touch sensor and a touch sensing circuit 150 to further provide a touch sensing function as well as an image display function.

The touch sensing circuit 150 may detect the presence of a touch (finger touch or pen touch) by a touch object, such as a finger or pen 10, or touch position by sensing the touch sensor.

For example, the touch sensing circuit 150 may include a touch driving circuit 160 that drives and senses the touch sensor and generates and outputs touch sensing data and a touch controller 170 that may detect an occurrence of a touch or the position of the touch using touch sensing data.

The touch sensor may include a plurality of sensor electrodes. Here, the touch sensor may also be referred to as a touch panel or a touchscreen panel (TSP).

The touch sensor may be of an external type in which it is present outside the display panel 110 or of an internal type in which it is present inside the display panel 110.

When the touch sensor is of the external type, the touch sensor and the display panel 110 may be separately manufactured or may be combined during an assembly process. The external-type touch sensor may include a substrate and a plurality of sensor electrodes on the substrate.

When the touch sensor is of the internal type, a plurality of sensor electrodes may be formed, together with various patterns for display driving, in the display panel 110 during the manufacturing process of the display panel 110.

The touch driving circuit 160 may supply a touch driving signal to at least one of the plurality of sensor electrodes and may sense at least one of the plurality of sensor electrodes to generate touch sensing data.

The touch sensing circuit 150 may perform touch sensing in a self-capacitance sensing scheme or a mutual-capacitance sensing scheme.

When the touch sensing circuit 150 performs touch sensing in the self-capacitance sensing scheme, the touch sensing circuit 150 may perform touch sensing based on capacitance between each sensor electrode and the touch object (e.g., finger or pen 10). According to the self-capacitance sensing scheme, each of the plurality of sensor electrodes may serve both as a transmission sensor electrode and as a reception sensor electrode. The touch driving circuit 160 may drive all or some of the plurality of sensor electrodes and sense all or some of the plurality of sensor electrodes.

When the touch sensing circuit 150 performs touch sensing in the mutual-capacitance sensing scheme, the touch sensing circuit 150 may perform touch sensing based on capacitance between the plurality of sensor electrodes. According to the mutual-capacitance sensing scheme, the plurality of sensor electrodes may be divided into a plurality of transmission sensor electrodes and the plurality of reception sensor electrodes. The touch driving circuit 160 may drive the plurality of transmission sensor electrodes and the plurality of reception sensor electrodes.

Hereinafter, the transmission sensor electrode is also referred to as a driving sensor electrode, and the reception sensor electrode is also referred to as a detecting sensor electrode.

The touch driving circuit 160 and the touch controller 170 included in the touch sensing circuit 150 may be implemented as separate devices or as a single device.

The touch driving circuit 160 and the data driving circuit 120 may be implemented as separate devices or as a single device. For example, the touch driving circuit 160 and the data driving circuit 120 may be configured as a single integrated circuit.

The display device 100 may further include a power supply circuit for supplying various types of power to the display driver integrated circuit and/or the touch sensing circuit 150.

The display device 100 according to embodiments of the disclosure may be a mobile terminal, such as a smart phone or a tablet, or a monitor or television (TV) in various sizes but, without limited thereto, may be a display in various types and various sizes capable of displaying information or images.

Figure 2:
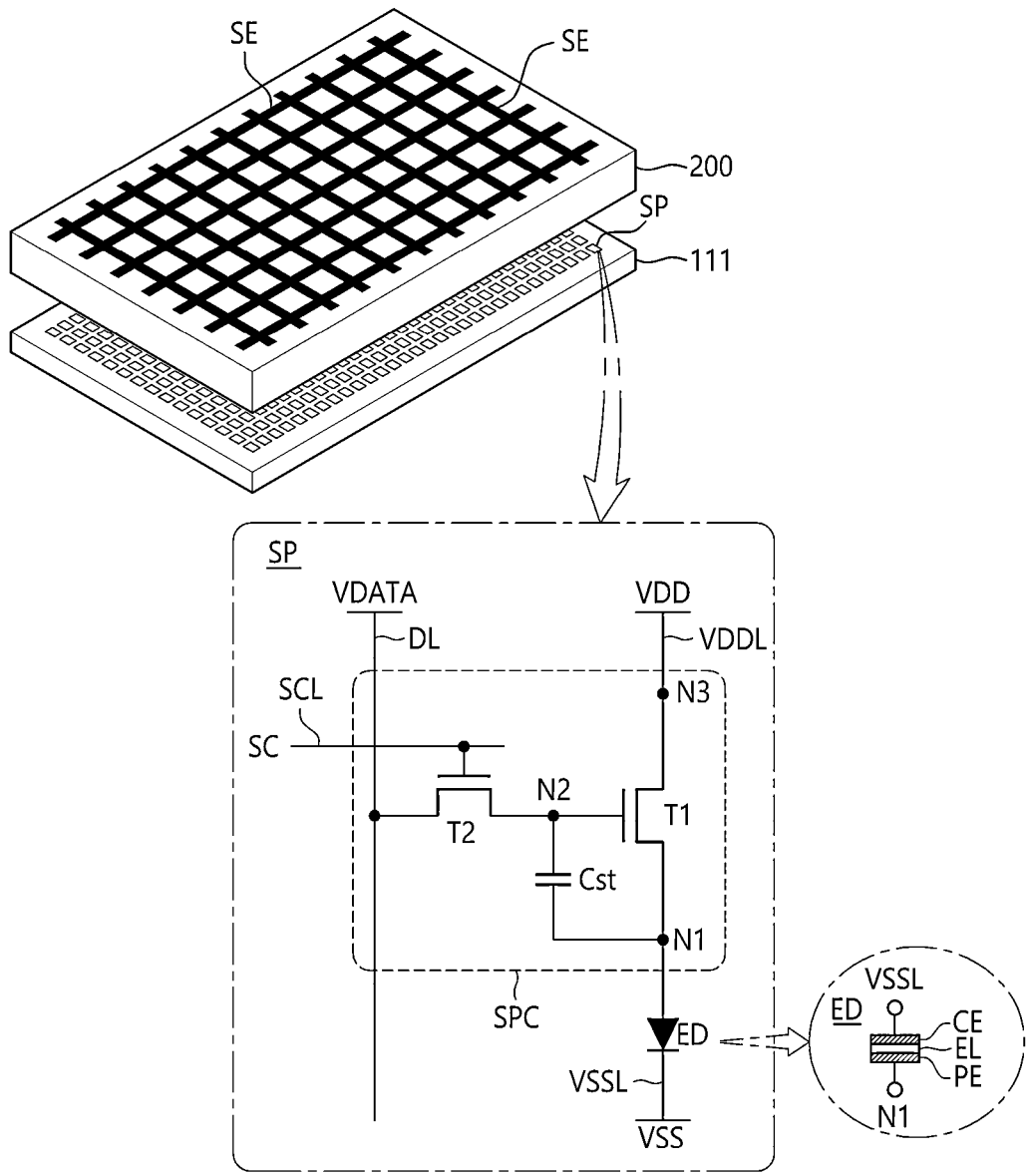
FIG. 2 illustrates a display panel according to an embodiment of the disclosure.

FIG. 2 illustrates a display panel 110 according to an embodiment of the disclosure.

Referring to FIG. 2, the display panel 110 may include a substrate 111 and a plurality of subpixels SP and an encapsulation layer 200 on the substrate 111. Here, the encapsulation layer 200 may also be referred to as an encapsulation substrate or an encapsulation portion.

Referring to FIG. 2, when the display device 100 according to embodiments of the disclosure is a self-luminous display device, each of the plurality of subpixels SP may include a light emitting element ED and a subpixel circuit unit SPC for driving the light emitting element ED.

Referring to FIG. 2, the subpixel circuit unit SPC may include a plurality of pixel driving transistors for driving the light emitting element ED and at least one capacitor.

The plurality of pixel driving transistors may include a first transistor T1, which is a driving transistor for driving the light emitting element ED, and a second transistor T2 for transferring the data signal VDATA to the second node N2 of the first transistor T1.

The at least one capacitor may include a storage capacitor Cst for maintaining a constant voltage during a frame.

To drive the subpixel SP, a data signal VDATA as an image signal and a scan signal SC as a gate signal may be applied to the subpixel SP. Further, for driving the subpixel SP, a common pixel driving voltage including the first driving voltage VDD and the second driving voltage VSS may be applied to the subpixel SP.

The light emitting element ED may include a pixel electrode PE, an element intermediate layer EL, and a common electrode CE. The pixel electrode PE may be an electrode disposed in each subpixel SP, and the common electrode CE may be an electrode commonly disposed in all the subpixels SP. The element intermediate layer EL may be a layer disposed between the pixel electrode PE and the common electrode CE, and may include an emission layer (EML).

When the light emitting element ED is an organic light emitting element, the element intermediate layer EL may include an emission layer (EML), a first common layer between the anode and the emission layer, and a second common layer between the emission layer and the cathode. The emission layer may be disposed for each subpixel SP, and the first and second common layers may be commonly disposed in the plurality of subpixels SP. Here, the anode may be the pixel electrode PE or the common electrode CE, and the cathode may be the common electrode CE or the pixel electrode PE.

For example, the common electrode CE may be electrically connected to the second driving voltage line VSSL. The second driving voltage VSS, which is one type of the common pixel driving voltage, may be applied to the common electrode CE through the second driving voltage line VSSL. The pixel electrode PE may be electrically connected to the first node N1 of the first transistor T1 of each subpixel SP.

For example, the pixel electrode PE may be an anode, and the common electrode CE may be a cathode. Conversely, the pixel electrode PE may be a cathode, and the common electrode CE may be an anode. For convenience of description, it is assumed below that the pixel electrode PE is an anode, and the common electrode CE is a cathode.

Each of the light emitting elements ED may include portions in which the pixel electrode PE, the element intermediate layer EL, and the common electrode CE overlap each other. A predetermined light emitting area may be formed by each light emitting element ED. For example, the light emitting area of each light emitting element ED may include an area in which the pixel electrode PE, the element intermediate layer EL, and the common electrode CE overlap.

For example, the light emitting element ED may be an organic light emitting diode (OLED), an inorganic light emitting diode (LED), or a quantum dot light emitting element.

The first transistor T1 may be a driving transistor for supplying a driving current to the light emitting element ED. The first transistor T1 may be connected between the first driving voltage line VDDL and the light emitting element ED.

The first transistor T1 may include a first node N1 electrically connected to the light emitting element ED, a second node N2 to which the data signal VDATA may be applied, and a third node N3 to which the driving voltage VDD is applied from the driving voltage line VDDL.

In the first transistor T1, the second node N2 may be the gate node, the first node N1 may be the source node or the drain node, and the third node N3 may be the drain node or the source node. Hereinafter, for convenience of description, in the first transistor T1, the second node N2 may be the gate node, the first node N1 may be the source node, and the third node N3 may be the drain node.

The second transistor T2 may be a switching transistor for transferring a data signal VDATA, which is an image signal, to the second node N2, which is the gate node of the first transistor T1, which is a driving transistor.

The second transistor T2 may be controlled to be turned on and off by the scan signal SC, which is a gate signal applied through the scan line SCL, which is a type of the gate line GL, to control electrical connection between the second node N2 of the first transistor T1 and the data line DL. The drain electrode or the source electrode of the second transistor T2 may be electrically connected to the data line DL, the source electrode or the drain electrode of the second transistor T2 may be electrically connected to the second node N2 of the first transistor T1, and the gate electrode of the second transistor T2 may be electrically connected to the scan line SCL.

The storage capacitor Cst may be electrically connected between the first node N1 and the second node N2 of the first transistor T1. The storage capacitor Cst may include a first capacitor electrode electrically connected to the first node N1 of the first transistor T1 or corresponding to the first node N1 of the first transistor T1, and a second capacitor electrode electrically connected to the second node N2 of the first transistor T1 or corresponding to the second node N2 of the first transistor T1.

Each of the first transistor T1 and the second transistor T2 may be an n-type transistor or a p-type transistor.

At least a portion of the subpixel circuit unit SPC may overlap at least a portion of the light emitting element ED in a vertical direction. Alternatively, the subpixel circuit unit SPC may not overlap the light emitting element ED in the vertical direction.

As illustrated in FIG. 2, the subpixel circuit unit SPC may have a 2T (Transistor) 1C (Capacitor) structure including two transistors T1 and T2 and one capacitor Cst. In some cases, the subpixel circuit unit SPC may further include one or more transistors or may further include one or more capacitors.

According to the structure of the subpixel circuit unit SPC, the type and number of gate signals supplied to the subpixel SP and gate lines may vary. Further, the type and the number of common pixel driving voltages supplied to the subpixel SP may vary according to the structure of the subpixel circuit unit SPC.

Since the circuit elements (especially the light emitting element ED implemented as the organic light emitting diode (OLED) including an organic material) in each subpixel SP are vulnerable to external moisture or oxygen, the encapsulation layer 200 for preventing external moisture or oxygen from penetrating into the circuit elements (especially the light emitting element ED) may be disposed on the display panel 110. The encapsulation layer 200 may be configured in various forms so that the light emitting elements ED do not contact moisture or oxygen.

Referring to FIG. 2, the display panel 110 according to embodiments of the disclosure may include a plurality of sensor electrodes SE for touch sensing. For example, a plurality of sensor electrodes SE may be disposed on the encapsulation layer 200.

The display panel 110 according to embodiments of the disclosure may further include a plurality of signal lines (hereinafter, referred to as a plurality of trace lines) for electrically connecting the plurality of sensor electrodes SE to the touch driving circuit 160.

The display device 100 according to an embodiment of the disclosure may have an extremely narrow bezel structure in which the non-display area NDA of the display panel 110 is very small or almost absent. Hereinafter, an extremely narrow bezel structure of the display panel 110 of the display device 100 according to an embodiment of the disclosure is described.

The display panel 110 according to embodiments of the disclosure has an internal trace structure as an extremely narrow bezel structure. The internal trace structure of the display panel 110 according to embodiments of the disclosure may be a structure in which a trace line for electrical connection between the sensor electrode SE and the touch driving circuit 160 is disposed across the display area DA without bypassing the non-display area NDA outside the display area DA. Hereinafter, an internal trace structure of the display panel 110 according to embodiments of the disclosure is described in more detail.

Figure 3:
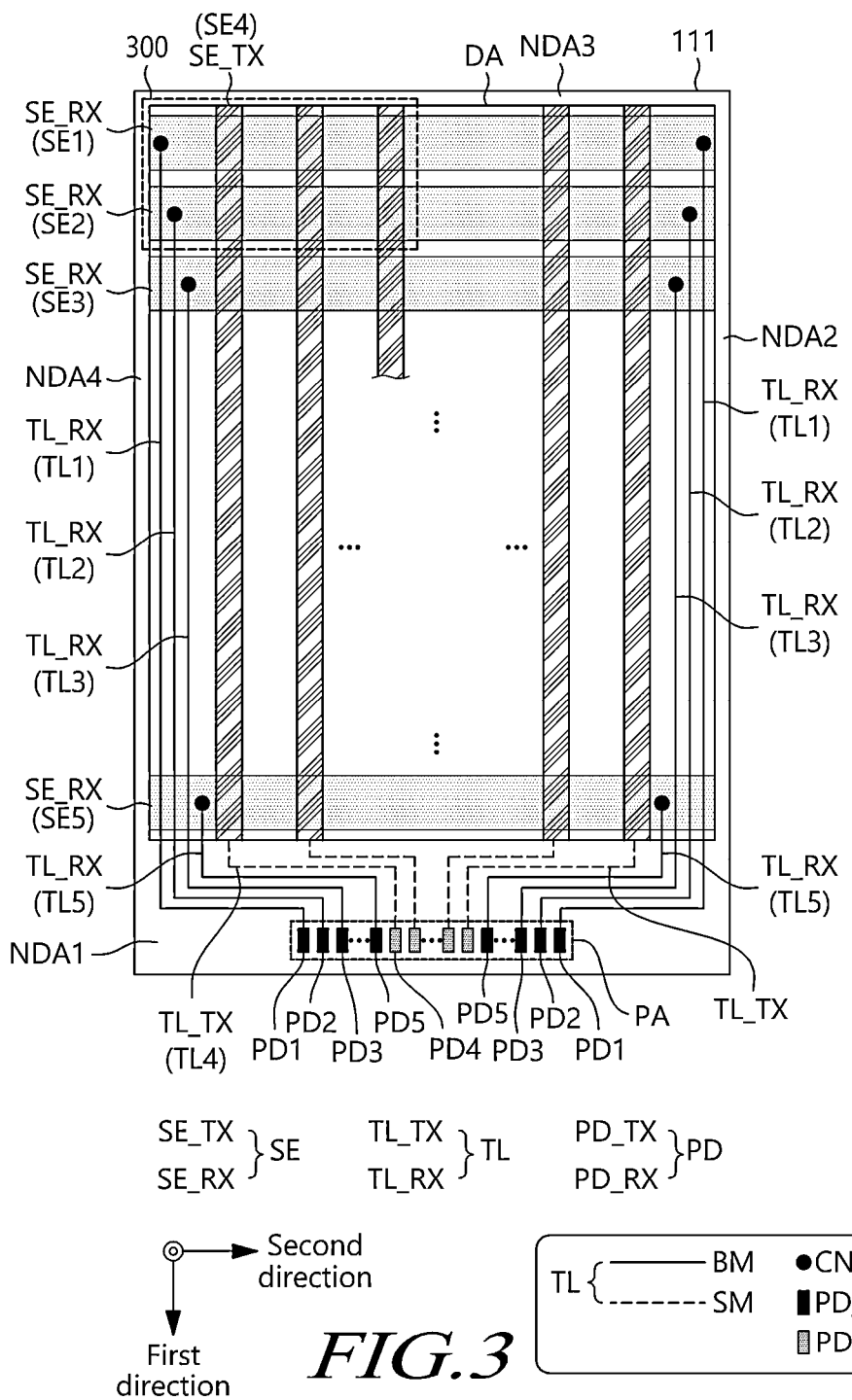
FIGS. 3, 4, 5, 6, and 7 are plan views illustrating a touch sensor included in a display panel according to embodiments of the disclosure.

FIG. 3 is a plan view illustrating a touch sensor included in a display panel 110 according to embodiments of the disclosure.

Referring to FIG. 3, the substrate 111 of the display panel 110 according to embodiments of the disclosure may include a display area DA in which a plurality of subpixels SP are disposed and a non-display area NDA including a pad area PA positioned in a first direction from the display area DA.

Referring to FIG. 3, the display panel 110 according to embodiments of the disclosure may include a touch sensor including a plurality of sensor electrodes SE disposed in the display area DA.

Referring to FIG. 3, the display panel 110 according to embodiments of the disclosure may further include a plurality of pads PD disposed in the pad area PA, and a plurality of trace lines TL for electrically connecting the plurality of sensor electrodes SE and the plurality of pads PD. The plurality of trace lines TL may be viewed as the components included in the touch sensor.

Referring to FIG. 3, the plurality of sensor electrodes SE may include a plurality of transmission sensor electrodes SE_TX and a plurality of reception sensor electrodes SE_RX. The plurality of trace lines TL may include a plurality of transmission trace lines TL_TX and a plurality of reception trace lines TL_RX. The plurality of pads PD may include a plurality of transmission pads PD_TX and a plurality of reception pads PD_RX.

A touch driving signal output from the touch driving circuit 160 may be applied to at least one of the plurality of transmission sensor electrodes SE_TX. Here, the touch driving signal may be a signal whose voltage level is changed. For example, the touch driving signal may be a pulse signal having a predetermined frequency and amplitude, and may be a signal having various signal waveforms such as a triangular wave, a spherical wave, or a sine wave.

Referring to FIG. 3, the plurality of transmission sensor electrodes SE_TX and the plurality of reception sensor electrodes SE_RX may be disposed to cross each other. For example, each of the plurality of transmission sensor electrodes SE_TX may be disposed to extend in the first direction. Each of the plurality of reception sensor electrodes SE_RX may be disposed to extend in the second direction different from the first direction.

The shape of each of the plurality of transmission sensor electrodes SE_TX and the plurality of reception sensor electrodes SE_RX may be variously modified. For example, each of the plurality of transmission sensor electrodes SE_TX and the plurality of reception sensor electrodes SE_RX may have a bar shape. As another example, each of the plurality of reception sensor electrodes SE_RX may be composed of several electrically connected sub sensor electrodes, or each of the plurality of transmission sensor electrodes SE_TX may be composed of several electrically connected sub sensor electrodes. For example, each of several sub sensor electrodes may have various shapes such as a square, a rhombus, or a comb pattern.

Referring to FIG. 3, when the internal trace structure of the display panel 110 according to embodiments of the disclosure is applied, one of the plurality of transmission trace lines TL_TX or the plurality of reception trace lines TL_RX may extend across the display area DA to the pad area PA without bypassing the non-display area NDA outside the display area DA.

For example, a plurality of reception trace lines TL_RX among the plurality of transmission trace lines TL_TX or the plurality of reception trace lines TL_RX may extend across the display area DA to the pad area PA without bypassing the non-display area NDA outside the display area DA. When the plurality of reception trace lines TL_RX cross the display area DA, the plurality of reception trace lines TL_RX may be disposed to avoid the light emitting area of each of the plurality of subpixels SP in the display area DA. Accordingly, it is possible to design an internal trace structure without deteriorating light emitting performance.

In this case, the plurality of reception trace lines TL_RX may cross the plurality of reception sensor electrodes SE_RX. In other words, the plurality of reception trace lines TL_RX may be positioned in a metal layer different from the plurality of reception sensor electrodes SE_RX, and may overlap the plurality of reception sensor electrodes SE_RX.

According to the internal trace structure of the display panel 110 according to embodiments of the disclosure, the size of the non-display area NDA may be significantly reduced.

Referring to FIG. 3, the non-display area NDA may include a first non-display area NDA1 positioned in the first direction from the display area DA, a second non-display area NDA2 positioned in the second direction from the display area DA, a third non-display area NDA3 positioned in a direction opposite to the first direction from the display area DA, and a fourth non-display area NDA4 positioned in a direction opposite to the second direction from the display area DA. That is, the first non-display area NDA1 is below the display area DA (e.g., a first side of the display area DA), the second non-display area NDA2 is at right side of the display area DA (e.g., a second side of the display area DA), the third non-display area NDA3 is above the display area DA (e.g., a third side of the display area DA), and the fourth non-display area NDA4 is at a left side of the display area DA (e.g., a fourth side of the display area DA).

Referring to FIG. 3, when the internal trace structure of the display panel 110 according to embodiments of the disclosure is applied, a plurality of trace lines TL may be disposed in the first non-display area NDA1 including the pad area PA among the first to fourth non-display areas NDA1 to NDA4, but a plurality of trace lines TL may not be disposed in the second non-display area NDA2 and the fourth non-display area NDA4.

Accordingly, the sizes of the second non-display area NDA2 and the fourth non-display area NDA4 among the first to fourth non-display areas NDA1 to NDA4 may be reduced to a limit.

Referring to FIG. 3, the plurality of transmission sensor electrodes SE_TX and the plurality of reception sensor electrodes SE_RX may include a sensor metal SM.

The plurality of transmission trace lines TL_TX or the plurality of reception trace lines TL_RX may cross the plurality of transmission sensor electrodes SE_TX or the plurality of reception sensor electrodes SE_RX. Accordingly, the plurality of transmission trace lines TL_TX or the plurality of reception trace lines TL_RX may include a bridge metal BM different from the sensor metal SM included in the plurality of transmission sensor electrodes SE_TX or the plurality of reception sensor electrodes SE_RX.

For example, as illustrated in FIG. 3, among the plurality of transmission trace lines TL_TX and the plurality of reception trace lines TL_RX, the plurality of reception trace lines TL_RX may traverse the display area DA and while crossing the plurality of reception sensor electrodes SE_RX.

In this case, the plurality of reception trace lines TL_RX may include a bridge metal BM different from the sensor metal SM. In this case, the plurality of transmission trace lines TL_TX may include the sensor metal SM or the bridge metal BM.

As another example, among the plurality of transmission trace lines TL_TX and the plurality of reception trace lines TL_RX, the plurality of transmission trace lines TL_TX may cross the plurality of transmission sensor electrodes SE_TX while traversing the display area DA. In this case, the plurality of transmission trace lines TL_TX may include a bridge metal BM different from the sensor metal SM. In this case, the plurality of reception trace lines TL_RX may include the sensor metal SM or the bridge metal BM.

Meanwhile, outside the display area DA (i.e., in the first non-display area NDA1), the trace lines TL may be changed from the sensor metal SM to the bridge metal BM or from the bridge metal BM to the sensor metal SM. If necessary, a third metal different from the sensor metal SM and the bridge metal BM may be utilized as some metals of the trace lines TL.

Hereinafter, modified examples of the touch sensor of FIG. 3 are described with reference to FIGS. 4, 5, 6, and 7. However, in describing the touch sensor of FIGS. 4, 5, 6, and 7, descriptions of the same features as those of the touch sensor of FIG. 3 will be omitted, and different features will be mainly described.

Figure 4:
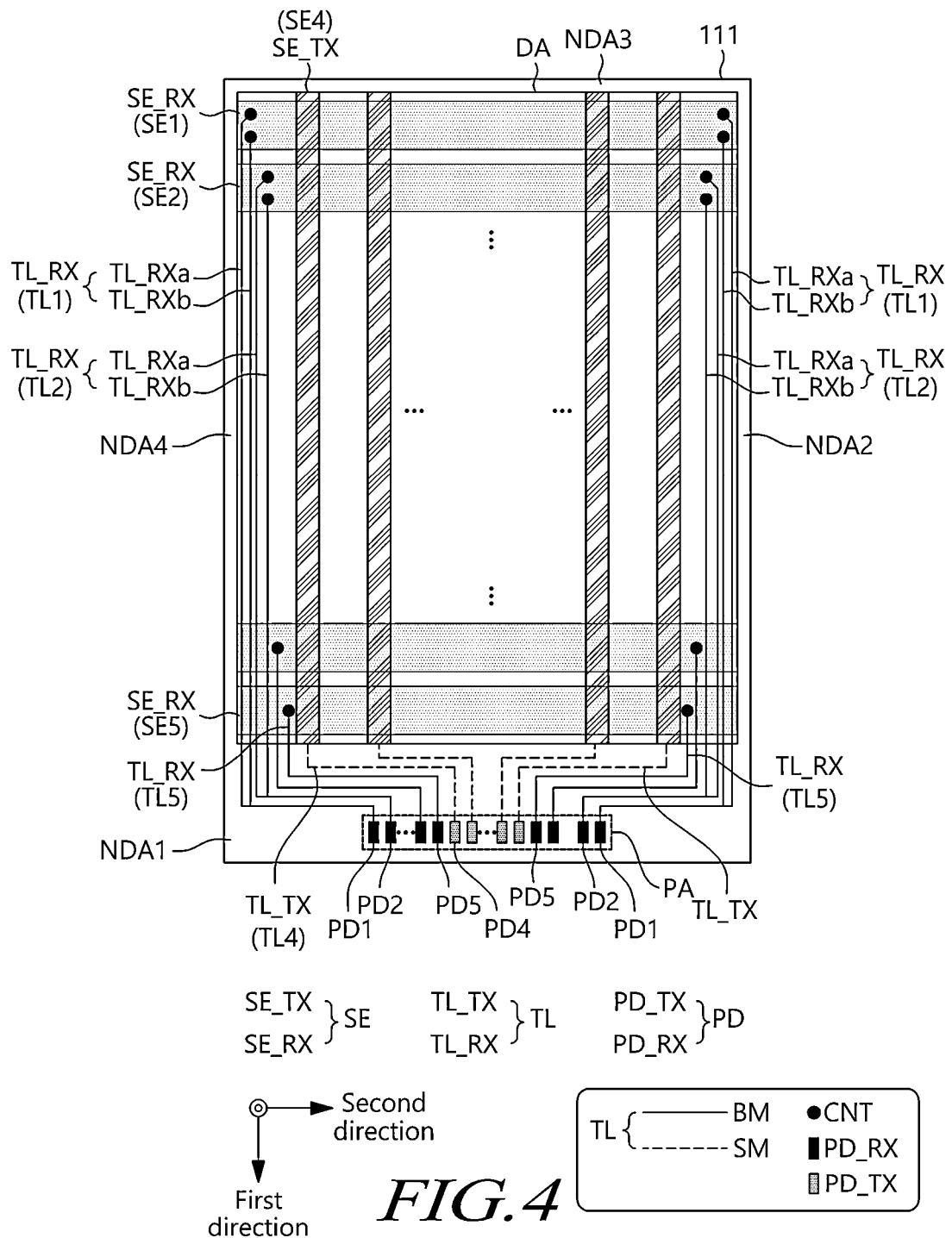

FIG. 4 is another plan view illustrating a touch sensor included in a display panel 110 according to embodiments of the disclosure.

Referring to FIG. 4, the touch sensor included in the display panel 110 according to embodiments of the disclosure may have a resistance-equivalent design structure.

The number of reception trace lines TL_RX connected to one reception sensor electrode SE_RX farthest from the pad area PA among the plurality of reception sensor electrodes SE_RX may be larger than the number of reception trace lines TL_RX connected to one reception sensor electrode SE_RX closest to the pad area PA among the plurality of reception sensor electrodes SE_RX.

For example, as illustrated in FIG. 4, two reception trace lines TL_RXa and TL_RXb may be connected to each of two opposite ends of one reception sensor electrode SE_RX farthest from the pad area PA among the plurality of reception sensor electrodes SE_RX, and one reception trace line TL_RX may be connected to each of two opposite ends of one reception sensor electrode SE_RX closest to the pad area PA among the plurality of reception sensor electrodes SE_RX.

Referring to FIG. 4, the first trace line TL1 connected to one end of the first sensor electrode SE1, which is the farthest one reception sensor electrode SE_RX, may include two reception trace lines TL_RXa and TL_RXb overlapping the display area DA and extending in the first direction. Similarly, the first trace line TL1 connected to the other end of the first sensor electrode SE1 may include two reception trace lines TL_RXa and TL_RXb overlapping the display area DA and extending in the first direction. The two reception trace lines TL_RXa and TL_RXb included in the first trace line TL1 connected to one end of the first sensor electrode SE1 may be physically connected in the non-display area NDA. The two reception trace lines TL_RXa and TL_RXb included in the first trace line TL1 connected to the other end of the first sensor electrode SE1 may be physically connected in the non-display area NDA.

As such, the two reception trace lines TL_RXa and TL_RXb may be physically connected (i.e., merged into one) in the non-display area NDA to be connected to one first pad PD1. Accordingly, the number of pads in the pad area PA may be reduced, and the number of pads (the number of channels) of the touch driving circuit 160 may be reduced. For example, when the plurality of reception sensor electrodes SE_RX are divided into n groups, the number of reception trace lines TL_RX connected to the reception sensor electrode SE_RX included in the first group closest to the pad area PA among the n groups may be 1, the number of reception trace lines TL_RX connected to the reception sensor electrode SE_RX included in the second group second closest to the pad area PA among the n groups may be 2, the number of reception trace lines TL_RX connected to the reception sensor electrode SE_RX included in the third group third closest to the pad area PA among the n groups may be 3, and the number of reception trace lines TL_RX connected to the reception sensor electrode SE_RX included in the nth group nth closest to the pad area PA among the n groups may be n.

According to the resistance-equivalent design structure of the touch sensor included in the display panel 110 according to embodiments of the disclosure, even though there is a length deviation between the plurality of reception trace lines TL_RX, the resistance deviation of the signal transmission path between the plurality of reception sensor electrodes SE_RX and the plurality of reception pads PD_RX may be reduced. Thus, touch sensitivity may be enhanced.

Meanwhile, referring to FIGS. 3 and 4, in the touch sensor included in the display panel 110 according to embodiments of the disclosure, all of the plurality of contact holes CNTs where the plurality of reception sensor electrodes SE_RX and the plurality of reception trace lines TL_RX are connected may be positioned further outside than the outermost transmission trace line TL_TX among the plurality of transmission trace lines TL_TX.

Figure 5:
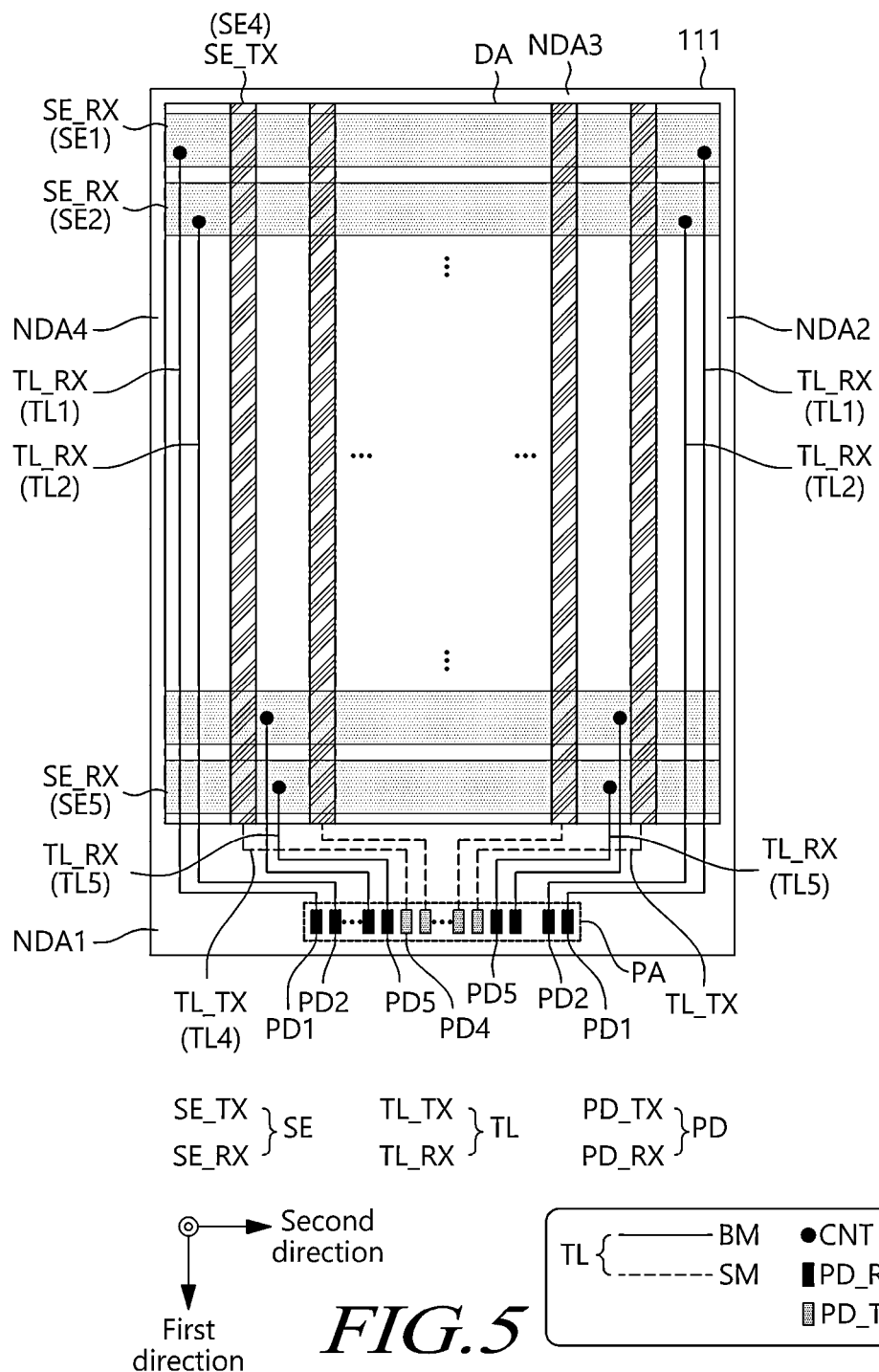

In other words, referring to FIGS. 3 and 4, the first trace line TL1, the second trace line TL2, the third trace line TL3, and the fifth trace line TL5 may be disposed to extend in the first direction from a border area in the display area DA. Here, the border area is a partial area included in the display area DA, and may be a partial area positioned further outside than the sensor electrode SE4 disposed at the outermost side among the sensor electrodes SE_TX extending in the first direction. In the examples of FIGS. 3 and 4, the border area may include a first border area positioned further outside than the sensor electrode SE4 disposed at the outermost side in the left direction (a direction opposite to the second direction) among the sensor electrodes SE_TX extending in the first direction, and a second border area positioned further outside than the sensor electrode disposed at the outermost side in the right direction (the second direction) among the sensor electrodes SE_TX extending in the first direction. FIG. 5 is another plan view illustrating a touch sensor included in a display panel 110 according to embodiments of the disclosure.

Referring to FIG. 5, in the touch sensor included in the display panel 110 according to embodiments of the disclosure, among the plurality of contact holes CNTs where the plurality of reception sensor electrodes SE_RX and the plurality of reception trace lines TL_RX are connected, some of the contact holes CNTs may be positioned further outside the outermost transmission trace line TL_TX among the plurality of transmission trace lines TL_TX, and other contact holes CNTs may be positioned further inside than the outermost transmission trace line TL_TX or TL4 among the plurality of transmission trace lines TL_TX and some transmission sensor electrodes SE_TX (e.g., the fourth sensor electrode SE4 disposed at the outermost side).

For example, the reception trace lines TL_RX respectively corresponding to the different reception sensor electrodes SE_RX may be disposed with the transmission sensor electrode SE_TX (e.g., the fourth sensor electrode SE4) interposed therebetween.

In the touch sensor of FIGS. 3, 4, and 5, each of the plurality of transmission sensor electrodes SE_TX may be disposed to extend in a first direction (e.g., a column direction), and each of the plurality of reception sensor electrodes SE_RX may be disposed to extend in a second direction (e.g., a row direction).

Figure 6:
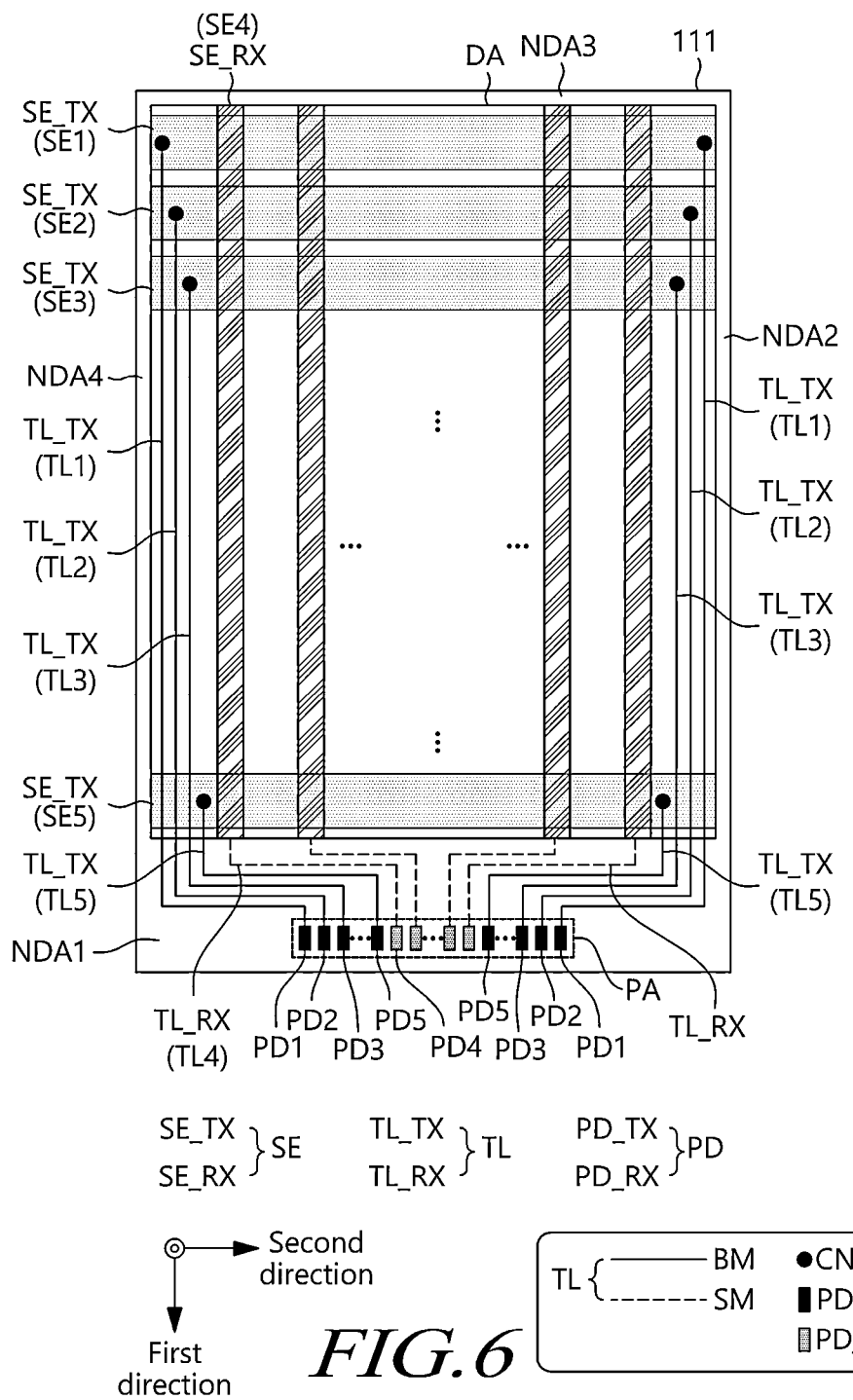

FIG. 6 is another plan view illustrating a touch sensor included in a display panel 110 according to embodiments of the disclosure.

Referring to FIG. 6, in the touch sensor included in the display panel 110 according to embodiments of the disclosure, each of the plurality of transmission sensor electrodes SE_TX may be disposed to extend in the second direction (e.g., row direction), and each of the plurality of reception sensor electrodes SE_RX may be disposed to extend in the first direction (e.g., column direction).

In FIGS. 3 to 7, the plurality of sensor electrodes SE disposed to extend in the second direction may include a first sensor electrode SE1, a second sensor electrode SE2, a third sensor electrode SE3, and a fifth sensor electrode SE5, and the plurality of sensor electrodes SE disposed to extend in the first direction includes a fourth sensor electrode SE4, as an example.

For example, in FIGS. 3, 4, 5, and 7, the plurality of reception sensor electrodes SE_RX extending in the second direction includes a first sensor electrode SE1, a second sensor electrode SE2, a third sensor electrode SE3, and a fifth sensor electrode SE5, and the plurality of transmission sensor electrodes SE_TX extending in the first direction include a fourth sensor electrode SE4.

As another example, in FIG. 6, the plurality of transmission sensor electrodes SE_TX extending in the second direction include a first sensor electrode SE1, a second sensor electrode SE2, a third sensor electrode SE3, and a fifth sensor electrode SE5, and the plurality of reception sensor electrodes SE_RX extending in the first direction include a fourth sensor electrode SE4.

As illustrated in FIGS. 3, 4, 5, and 6, at least one first trace line TL1 may be electrically connected to two opposite ends of the first sensor electrode SE1 disposed to extend in the second direction. In other words, one or two or more first trace lines TL1 may be electrically connected to one end of two opposite ends of the first sensor electrode SE1, and one or two or more first trace lines TL1 may be electrically connected to the other end of the two opposite ends of the first sensor electrode SE1. In this case, the signal transmission delay at the first sensor electrode SE1 itself, which is elongated in the second direction may be reduced.

Likewise, at least one second trace line TL2 may be electrically connected to two opposite ends of the second sensor electrode SE2 disposed to extend in the second direction. At least one third trace line TL3 may be electrically connected to two opposite ends of the third sensor electrode SE3 disposed to extend in the second direction. At least one fifth trace line TL5 may be electrically connected to two opposite ends of the fifth sensor electrode SE5 disposed to extend in the second direction.

Alternatively, at least one first trace line TL1 may be electrically connected to only one end of two opposite ends of the first sensor electrode SE1 disposed to extend in the second direction. At least one second trace line TL2 may be electrically connected to only one end of two opposite ends of the second sensor electrode SE2 disposed to extend in the second direction. At least one third trace line TL3 may be electrically connected to only one of two opposite ends of the third sensor electrode SE3 disposed to extend in the second direction. At least one fifth trace line TL5 may be electrically connected to only one of two opposite ends of the fifth sensor electrode SE5 disposed to extend in the second direction.

As illustrated in FIGS. 3, 4, 5, and 6, the two first trace lines TL1 connected to two opposite ends of the first sensor electrode SE1 may be electrically connected to two first pads PD1. The two second trace lines TL2 connected to two opposite ends of the second sensor electrode SE2 may be electrically connected to two second pads PD2. The two third trace lines TL3 connected to two opposite ends of the third sensor electrode SE3 may be electrically connected to two third pads PD3. The two fifth trace lines TL5 connected to two opposite ends of the fifth sensor electrode SE5 may be electrically connected to two fifth pads PD5.

Figure 7:
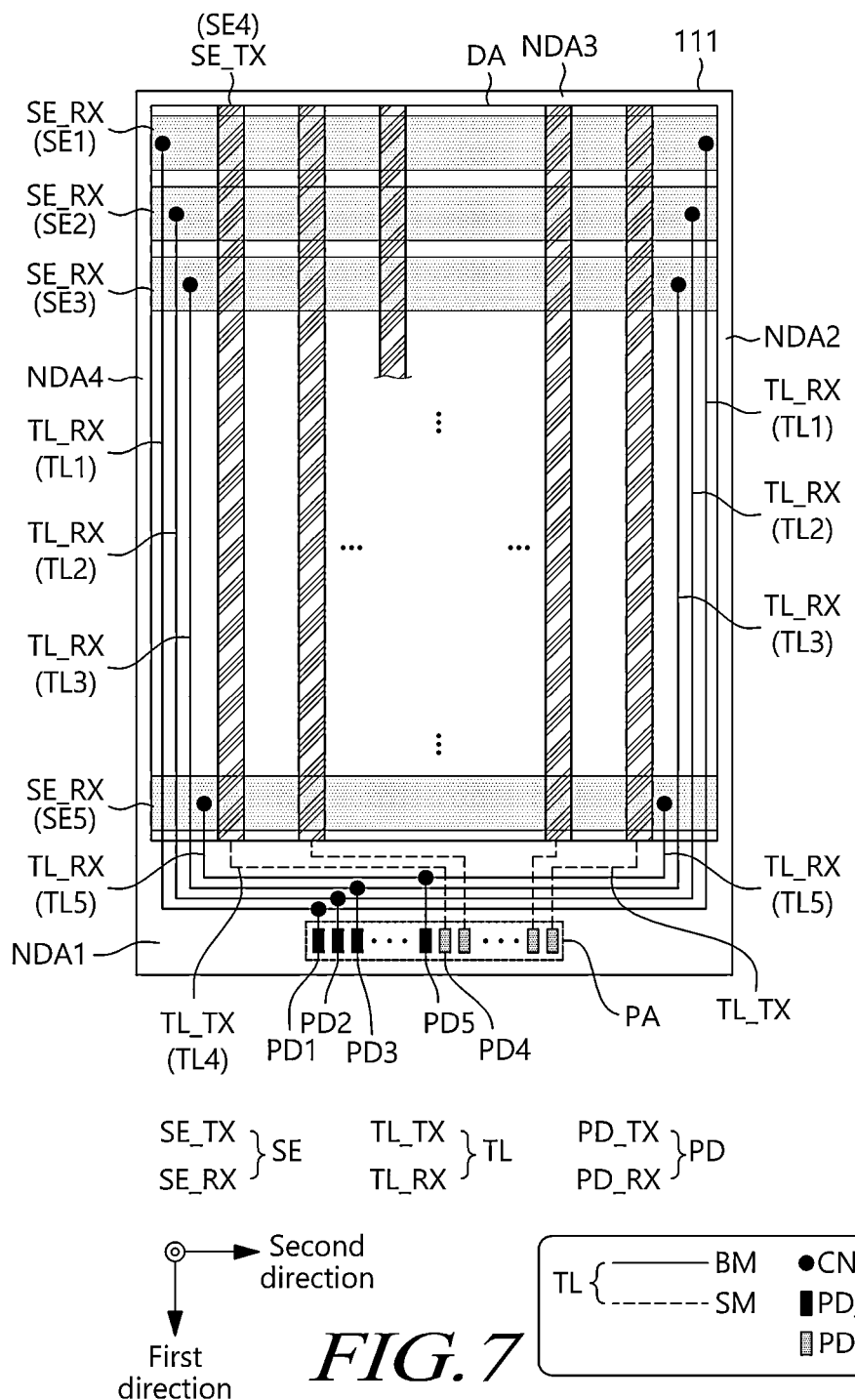

FIG. 7 is another plan view illustrating a touch sensor included in a display panel 110 according to embodiments of the disclosure.

Referring to FIG. 7, two first trace lines TL1 may be electrically connected to two opposite ends of the first sensor electrode SE1 disposed to extend in the second direction. In other words, one first trace line TL1 may be electrically connected to one end of two opposite ends of the first sensor electrode SE1, and one first trace line TL1 may be electrically connected to the other end of the two opposite ends of the first sensor electrode SE1. In this case, when the first sensor electrode SE1 is longer in the second direction, the signal transmission delay at the first sensor electrode SE1 itself may be reduced.

Likewise, two second trace lines TL2 may be electrically connected to two opposite ends of the second sensor electrode SE2 disposed to extend in the second direction. Two third trace line TL3 may be electrically connected to two opposite ends of the third sensor electrode SE3 disposed to extend in the second direction. Two fifth trace line TL5 may be electrically connected to two opposite ends of the fifth sensor electrode SE5 disposed to extend in the second direction.

As described above, by connecting two trace lines TL to one sensor electrode SE, a signal transmission delay occurring in the sensor electrode SE itself may be reduced.

Referring to FIG. 7, two first trace lines TL1 connected to two opposite ends of the first sensor electrode SE1 may be commonly connected to one first pad PD1. The two second trace lines TL2 connected to two opposite ends of the second sensor electrode SE2 may be commonly connected to one second pad PD2. The two third trace lines TL3 connected to two opposite ends of the third sensor electrode SE3 may be commonly connected to one third pad PD3. The two fifth trace lines TL5 connected to two opposite ends of the fifth sensor electrode SE5 may be commonly connected to one fifth pad PD5.

According to this pad shared structure, one pad may be connected to two trace lines TL connected to two opposite ends of one sensor electrode SE. Accordingly, the number of pads and the size of the pad area PA in the display panel 110 may be reduced, and the number of pads (the number of channels) of the touch driving circuit 160 connected to the pad area PA may be reduced. Accordingly, the size of the touch driving circuit 160 may also be reduced.

Referring to FIGS. 3 to 7, the plurality of transmission pads PD_TX and the plurality of reception pads PD_RX disposed in the pad area PA may be arranged to be gathered for each type. In other words, the plurality of transmission pads PD_TX may be arranged together, and the plurality of reception pads PD_RX may be arranged together.

Alternatively, the plurality of transmission pads PD_TX and the plurality of reception pads PD_RX disposed in the pad area PA may be mixed and disposed.

Referring to FIGS. 3, 4, and 6, in the first non-display area NDA1, the plurality of transmission trace lines TL_TX and the plurality of reception trace lines TL_RX may not cross each other. In this case, the plurality of transmission trace lines TL_TX and the plurality of reception trace lines TL_RX may not overlap in the vertical direction. Accordingly, the plurality of transmission trace lines TL_TX and the plurality of reception trace lines TL_RX may be disposed in different metal layers or may be disposed in the same metal layer.

Referring to FIGS. 5 and 7, in the first non-display area NDA1, all or some of the plurality of reception trace lines TL_RX may cross all or some of the plurality of transmission trace lines TL_TX. In this case, the plurality of transmission trace lines TL_TX and the plurality of reception trace lines TL_RX may overlap in the vertical direction. Accordingly, the plurality of transmission trace lines TL_TX and the plurality of reception trace lines TL_RX should be disposed in different metal layers.

Referring to FIGS. 3 to 7, the substrate 111 may include a display area DA in which a plurality of subpixels SP are disposed and a non-display area NDA including a pad area PA positioned in a first direction from the display area DA.

Referring to FIGS. 3 to 7, the non-display area NDA may include a first non-display area NDA1 positioned in the first direction from the display area DA, a second non-display area NDA2 positioned in the second direction from the display area DA, a third non-display area NDA3 positioned in a direction opposite to the first direction from the display area DA, and a fourth non-display area NDA4 positioned in a direction opposite to the second direction from the display area DA. For example, the first direction may be a column direction (Y-axis direction), and the second direction crossing the first direction may be a row direction (X-axis direction).

Referring to FIGS. 3 to 7, the plurality of sensor electrodes SE may include a first sensor electrode SE1 disposed in the display area DA and extending in the second direction, and a second sensor electrode SE2 disposed in the display area DA and extending in the second direction.

Referring to FIGS. 3 to 7, the plurality of pads PD may include a first pad PD1 disposed in the pad area PA and a second pad PD2 disposed in the pad area PA.

Referring to FIGS. 3 to 7, the plurality of trace lines TL may include a first trace line TL1 electrically connecting the first sensor electrode SE1 and the first pad PD1, and a second trace line TL2 electrically connecting the second sensor electrode SE2 and the second pad PD2.

Referring to FIGS. 3 to 7, the second sensor electrode SE2 may be positioned closer to the pad area PA than the first sensor electrode SE1. The first trace line TL1 may overlap the second sensor electrode SE2.

Referring to FIGS. 3 to 7, the first trace line TL1 and the second trace line TL2 may extend to the pad area PA across the display area DA in the first direction.

Referring to FIGS. 3 to 7, the plurality of sensor electrodes SE may further include a third sensor electrode SE3 disposed in the display area DA and extending in the second direction, the plurality of pads PD may further include a third pad PD3 disposed in the pad area PA, and the plurality of trace lines TL may further include a third trace line TL3 electrically connecting the third sensor electrode SE3 and the third pad PD3.

The third sensor electrode SE3 may be positioned closer to the pad area PA than the second sensor electrode SE2.

Each of the first trace line TL1 and the second trace line TL2 may overlap the third sensor electrode SE3.

Referring to FIGS. 3 to 7, the plurality of sensor electrodes SE may further include a fourth sensor electrode SE4 disposed in the display area DA and extending in the first direction and a fifth sensor electrode SE5 disposed in the display area DA and extending in the second direction, the plurality of pads PD may further include a fourth pad PD4 disposed in the pad area PA and a fifth pad PD5 disposed in the pad area PA, and the plurality of trace lines TL may include a fourth trace line TL4 for electrically connecting the fourth sensor electrode SE4 and the fourth pad PD4 and a fifth trace line TL5 for electrically connecting the fifth sensor electrode SE5 and the fifth pad PD5.

The fourth sensor electrode SE4 may be positioned closer to the pad area PA than the first sensor electrode SE1 and the second sensor electrode SE2.

Each of the first trace line TL1, the second trace line TL2, and the third trace line TL3 may overlap the fifth sensor electrode SE5.

Referring to FIGS. 3, 4, 5, and 7, among the first sensor electrode SE1, the second sensor electrode SE2, the third sensor electrode SE3, the fourth sensor electrode SE4, and the fifth sensor electrode SE5, the fourth sensor electrode SE4 may be a transmission sensor electrode, and the first sensor electrode SE1, the second sensor electrode SE2, the third sensor electrode SE3, and the fifth sensor electrode SE5 may be reception sensor electrodes.

Accordingly, a signal (touch driving signal) whose voltage level is varied may be supplied to the fourth sensor electrode SE4 from the touch driving circuit 160.

Referring to FIG. 6, among the first sensor electrode SE1, the second sensor electrode SE2, the third sensor electrode SE3, the fourth sensor electrode SE4, and the fifth sensor electrode SE5, the fourth sensor electrode SE4 may be a reception sensor electrode, and the first sensor electrode SE1, the second sensor electrode SE2, the third sensor electrode SE3, and the fifth sensor electrode SE5 may be transmission sensor electrodes.

Each of the first sensor electrode SE1, the second sensor electrode SE2, the third sensor electrode SE3, and the fifth sensor electrode SE5 may be supplied with a signal (a touch driving signal) whose voltage level is varied from the touch driving circuit 160.

Referring to FIG. 4, the number of first trace lines TL1 connected to the first sensor electrode SE1 may be larger than the number of fifth trace lines TL5 connected to the fifth sensor electrode SE5. For example, the number of first trace lines TL1 connected to the first sensor electrode SE1 may be twice the number of fifth trace lines TL5 connected to the fifth sensor electrode SE5. As illustrated in FIG. 4, the number of first trace lines TL1 connected to the first sensor electrode SE1 may be four, and the number of fifth trace lines TL5 connected to the fifth sensor electrode SE5 may be two. As another example, the number of first trace lines TL1 connected to the first sensor electrode SE1 may be two, and the number of fifth trace lines TL5 connected to the fifth sensor electrode SE5 may be one.

Referring to FIGS. 3 to 7, the fourth sensor electrode SE4 may cross the first sensor electrode SE1, the second sensor electrode SE2, and the fifth sensor electrode SE5.

Referring to FIGS. 3, 4, 6, and 7, the first trace line TL1, the second trace line TL2, the third trace line TL3, and the fifth trace line TL5 may all be disposed outside the fourth sensor electrode SE4.

Referring to FIG. 5, among the first trace line TL1, the second trace line TL2, the third trace line TL3, and the fifth trace line TL5, the first trace line TL1, the second trace line TL2, and the third trace line TL3 may be disposed outside the fourth sensor electrode SE4, and the fifth trace line TL5 may be disposed inside the fourth sensor electrode SE4. That is, the fourth sensor electrode SE4 is between the first trace line TL1 and the fifth trace line TL5. In this case, the fourth sensor electrode SE4 may be disposed between the first trace line TL1 and the fifth trace line TL5. Alternatively, the fourth sensor electrode SE4 may be disposed between the contact hole CNT of the first trace line TL1 and the first sensor electrode SE1, and the contact hole CNT of the fifth trace line TL5 and the fifth sensor electrode SE5.

Referring to FIGS. 3 to 7, the plurality of transmission pads PD_TX and the plurality of reception pads PD_RX disposed in the pad area PA may be arranged to be gathered for each type. In other words, the plurality of transmission pads PD_TX may be arranged together, and the plurality of reception pads PD_RX may be arranged together.

Alternatively, the plurality of transmission pads PD_TX and the plurality of reception pads PD_RX disposed in the pad area PA may be mixed and disposed.

Referring to FIG. 5, when the plurality of transmission pads PD_TX and the plurality of reception pads PD_RX disposed in the pad area PA are disposed to be gathered for each type, the fifth pad PD5 may be disposed between the first pad PD1 and the fourth pad PD4.

In this case, the fifth trace line TL5 may cross the fourth trace line TL4. Accordingly, the fifth trace line TL5 should be positioned in a metal layer different from the fourth trace line TL4. For example, the fifth trace line TL5 may include a bridge metal, and the fourth trace line TL4 may include a sensor metal.

When the plurality of transmission pads PD_TX and the plurality of reception pads PD_RX disposed in the pad area PA are disposed to be mixed, unlike in FIG. 5, the fourth pad PD4 may be disposed between the first pad PD1 and the fifth pad PD5.

The fifth trace line TL5 may not cross the fourth trace line TL4. Accordingly, the fifth trace line TL5 may be positioned in the same metal layer as the fourth trace line TL4. For example, the fifth trace line TL5 and the fourth trace line TL4 may include a bridge metal or a sensor metal.

Hereinafter, for convenience of description, the plurality of sensor electrodes SE disposed to extend in the first direction are the transmission sensor electrodes SE_TX, and the plurality of sensor electrodes SE disposed to extend in the second direction are the reception sensor electrodes SE_RX. However, the following description may be equally applied even when the plurality of sensor electrodes SE disposed to extend in the first direction are the reception sensor electrodes SE_RX, and the plurality of sensor electrodes SE disposed to extend in the second direction are the transmission sensor electrodes SE_TX.

Figure 8:
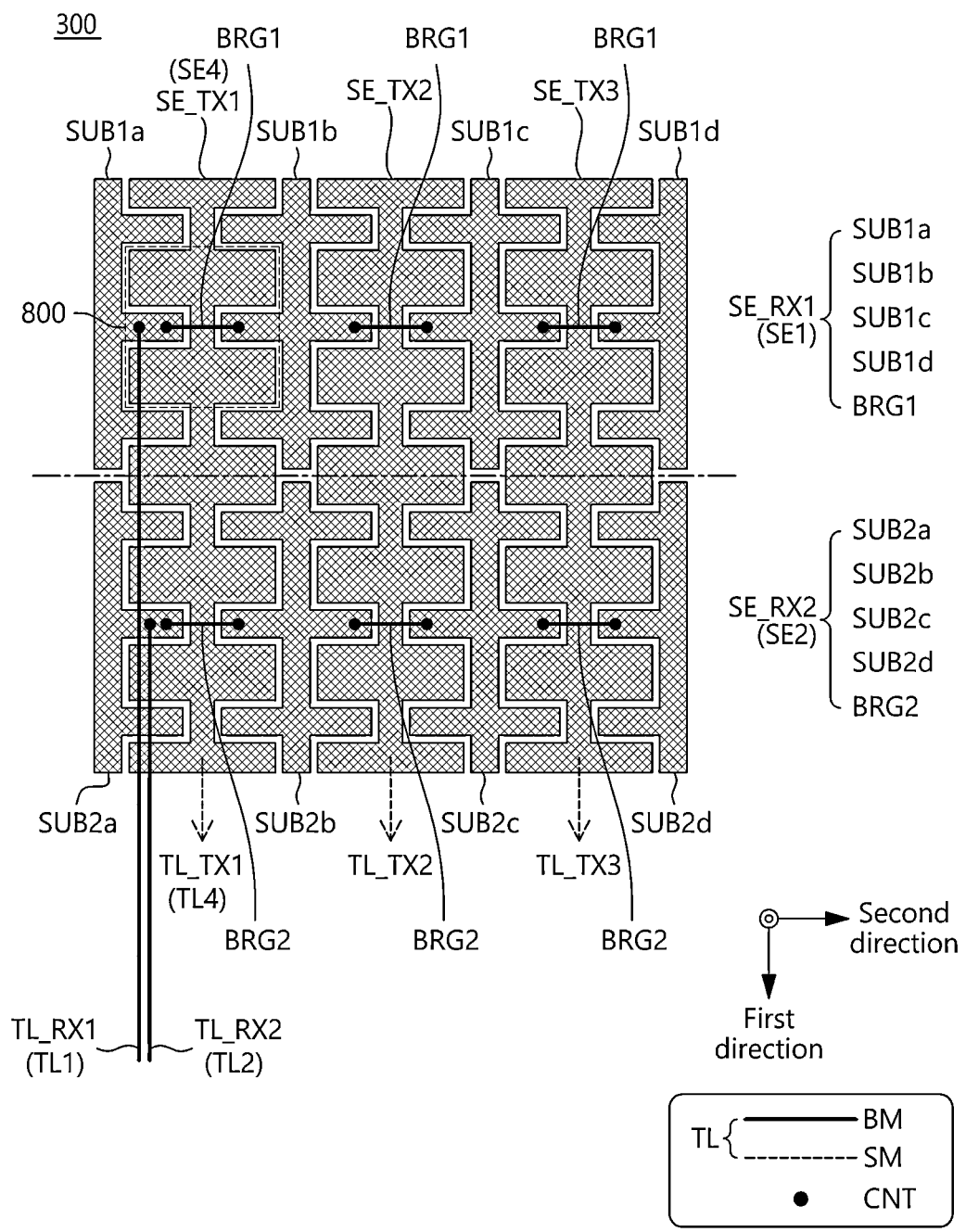
FIG. 8 exemplarily illustrates, in detail, a partial area of a touch sensor included in a display panel according to embodiments of the disclosure.
Figure 9:
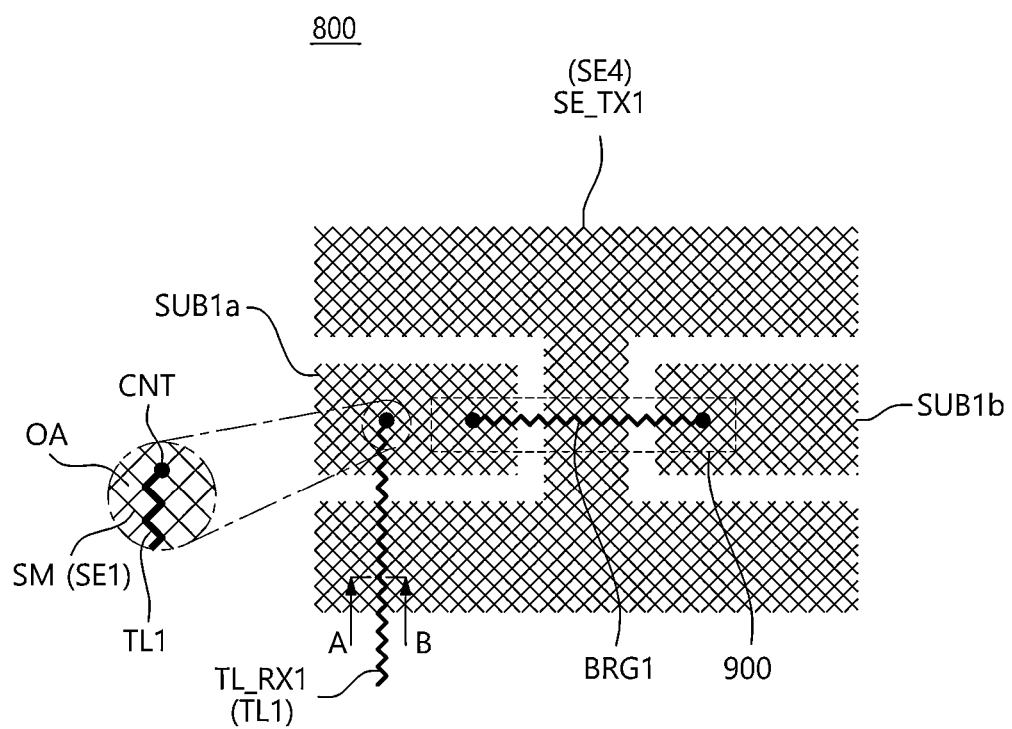
FIG. 9 illustrates a unit sensor in a touch sensor included in a display panel according to embodiments of the disclosure.

FIG. 8 illustrates, in detail, an example of a partial area 300 of a touch sensor included in a display panel 110 according to embodiments of the disclosure. FIG. 9 illustrates a unit sensor in a touch sensor included in a display panel 110 according to embodiments of the disclosure, and is an enlarged view of the area 800 representing the unit sensor of FIG. 8. In the following description, a reference is also made to FIG. 3. Here, the unit sensor 800 may mean an area where one transmission touch electrode SE_TX and one reception touch sensor electrode SE_RX cross each other.

FIG. 8 is an enlarged plan view of the partial area 300 of FIG. 3, and illustrates an example in which each sensor electrode SE included in the touch sensor has a comb-tooth shape. Referring to FIG. 8, one sensor electrode SE may be configured as one integrated electrode or may be configured as several sub sensor electrodes electrically connected to each other.

Referring to FIG. 8, in a partial area 300 of the touch sensor of FIG. 3, a first reception sensor electrode SE_RX1 and a second reception sensor electrode SE_RX2 extending in the second direction (e.g., row direction) may be disposed, and a first transmission sensor electrode SE_TX1, a second transmission sensor electrode SE_TX2, and a third transmission sensor electrode SE_TX3 extending in the first direction (e.g., column direction) may be disposed. Here, the first direction and the second direction may be directions that cross each other.

Referring to FIG. 8, in the partial area 300 of the touch sensor of FIG. 3, a first reception trace line TL_RX1 electrically connected to the first reception sensor electrode SE_RX1 and a second reception trace line TL_RX2 electrically connected to the second reception sensor electrode SE_RX2 may be further disposed.

Referring to FIG. 8, the first transmission sensor electrode SE_TX1, the second transmission sensor electrode SE_TX2, and the third transmission sensor electrode SE_TX3 may be electrically connected to the first transmission trace line TL_TX1, the second transmission trace line TL_TX2, and the third transmission trace line TL_TX3, respectively, in or near the first non-display area NDA1.

Hereinafter, the first reception sensor electrode SE_RX1 may be referred to as a first sensor electrode SE1, the second reception sensor electrode SE_RX2 may be referred to as a second sensor electrode SE2, and the first transmission sensor electrode SE_TX1 may be referred to as a fourth sensor electrode SE4. Further, the first reception trace line TL_RX1 may be referred to as a first trace line TL1, the second reception trace line TL_RX2 may be referred to as a second trace line TL2, and the first transmission trace line TL_TX1 may be referred to as a fourth trace line TL4. Further, the first reception pad PD_RX to which the first reception sensor electrode SE_RX1 is connected through the first reception trace line TL_RX1 may be referred to as a first pad PD1, the second reception pad PD_RX to which the second reception sensor electrode SE_RX2 is connected through the second reception trace line TL_RX2 may be referred to as a second pad PD2, and the first transmission pad PD_TX to which the first transmission sensor electrode SE_TX1 is connected through the first transmission trace line TL_TX1 may be referred to as a fourth pad PD4.

Likewise, the third reception sensor electrode SE_RX disposed adjacent to the second reception sensor electrode SE2 in the first direction may be referred to as a third sensor electrode SE3, and the reception sensor electrode SE_RX disposed closest to the pad area PA among the plurality of reception sensor electrodes SE_RX may be referred to as a fifth sensor electrode SE5. Further, the reception trace line TL_RX connected to the third sensor electrode SE3 may be referred to as a third trace line TL3, and the reception trace line TL_RX connected to the fifth sensor electrode SE5 may be referred to as a fifth trace line TL5. Further, the reception pad PD_RX to which the third sensor electrode SE3 is connected through the third trace line TL3 may be referred to as a third pad PD3, and the reception pad PD_RX to which the fifth sensor electrode SE5 is connected through the fifth trace line TL5 may be referred to as a fifth pad PD5.

Each of the first, second, and third transmission sensor electrodes SE_TX1, SE_TX2, and SE_TX3 may be configured as one integrated electrode. The first reception sensor electrode SE_RX1 may include a plurality of first sub sensor electrodes SUB1a, SUB1b, SUB1c, and SUB1d electrically connected by the first bridge BRG1. The second reception sensor electrode SE_RX2 may include a plurality of second sub sensor electrodes SUB2a, SUB2b, SUB2c, and SUB2d electrically connected by the second bridge BRG2.

The first bridge BRG1 may overlap the first, second, and third transmission sensor electrodes SE_TX1, SE_TX2, and SE_TX3. The second bridge BRG2 may overlap the first, second, and third transmission sensor electrodes SE_TX1, SE_TX2, and SE_TX3.

Referring to FIG. 8, the first transmission sensor electrode SE_TX1 may pass between the two first sub sensor electrodes SUB1a and SUB1b included in the first reception sensor electrode SE_RX1 and between the two second sub sensor electrodes SUB2a and SUB2b included in the second reception sensor electrode SE_RX2. That is, a first portion of the first transmission sensor electrode SE_TX1 is between the two first sub sensor electrodes SUB1a and SUB1b and overlaps the first bridge BRG1 and a second portion of the first transmission sensor electrode SE_TX1 is between the two second sub sensor electrodes SUB2a and SUB2b and overlaps the second bridge BRG2.

The first bridge BRG1 electrically connecting the two first sub sensor electrodes SUB1a and SUB1b included in the first reception sensor electrode SE_RX1 may overlap the first transmission sensor electrode SE_TX1.

The second bridge BRG2 electrically connecting the two second sub sensor electrodes SUB2a and SUB2b included in the second reception sensor electrode SE_RX2 may overlap the first transmission sensor electrode SE_TX1.

Referring to FIG. 8, the second transmission sensor electrode SE_TX2 may pass between other two first sub sensor electrodes SUB1b and SUB1c included in the first reception sensor electrode SE_RX1 and between other two second sub sensor electrodes SUB2b and SUB2c included in the second reception sensor electrode SE_RX2.

The first bridge BRG1 electrically connecting the other two first sub sensor electrodes SUB1b and SUB1c included in the first reception sensor electrode SE_RX1 may overlap the second transmission sensor electrode SE_TX2.

The second bridge BRG2 electrically connecting the other two second sub sensor electrodes SUB2b and SUB2c included in the second reception sensor electrode SE_RX2 may overlap the second transmission sensor electrode SE_TX2.

Referring to FIG. 8, the third transmission sensor electrode SE_TX3 may pass between other two first sub sensor electrodes SUB1c and SUB1d included in the first reception sensor electrode SE_RX1 and between other two second sub sensor electrodes SUB2c and SUB2d included in the second reception sensor electrode SE_RX2.

The first bridge BRG1 electrically connecting the other two first sub sensor electrodes SUB1c and SUB1d included in the first reception sensor electrode SE_RX1 may overlap the third transmission sensor electrode SE_TX3.

The second bridge BRG2 electrically connecting the other two second sub sensor electrodes SUB2c and SUB2d included in the second reception sensor electrode SE_RX2 may overlap the third transmission sensor electrode SE_TX3.

Referring to FIG. 8, the first reception trace line TL_RX1 may be electrically connected to at least one (e.g., SUB1a) of the plurality of first sub sensor electrodes SUB1a, SUB1b, SUB1c, and SUB1d constituting the first reception sensor electrode SE_RX1 through a contact hole CNT.

The second reception trace line TL_RX2 may be electrically connected to at least one (e.g., SUB2a) of the plurality of second sub sensor electrodes SUB2a, SUB2b, SUB2c, and SUB2d constituting the second reception sensor electrode SE_RX2 through the contact hole CNT.

Referring to FIG. 8, the first transmission sensor electrode SE_TX1 may be electrically connected to the first transmission trace line TL_TX1 at a point closest to the first non-display area NDA1. Alternatively, the first transmission sensor electrode SE_TX1 may extend to the first non-display area NDA1. A portion extending to the first non-display area NDA1 in the first transmission sensor electrode SE_TX1 may correspond to the first transmission trace line TL_TX1.

The second transmission sensor electrode SE_TX2 may be electrically connected to the second transmission trace line TL_TX2 at a point closest to the first non-display area NDA1. Alternatively, the second transmission sensor electrode SE_TX2 may extend to the first non-display area NDA1. A portion extending to the first non-display area NDA1 in the second transmission sensor electrode SE_TX2 may correspond to the second transmission trace line TL_TX2.

The third transmission sensor electrode SE_TX3 may be electrically connected to the third transmission trace line TL_TX3 at a point closest to the first non-display area NDA1. Alternatively, the third transmission sensor electrode SE_TX3 may extend to the first non-display area NDA1. A portion extending to the first non-display area NDA1 in the third transmission sensor electrode SE_TX3 may correspond to the third transmission trace line TL_TX3.

Referring to FIG. 8, the plurality of first sub sensor electrodes SUB1a, SUB1b, SUB1c, and SUB1d included in the first reception sensor electrode SE_RX1 and the plurality of second sub sensor electrodes SUB2a, SUB2b, SUB2c, and SUB2d included in the second reception sensor electrode SE_RX2 may be formed of a sensor metal SM disposed in the sensor metal layer.

The first bridge BRG1 and the second bridge BRG2 may be formed of a bridge metal BM disposed in a bridge metal layer that is a metal layer different from the sensor metal layer.

An insulating layer may be present between the bridge metal layer and the sensor metal layer.

Referring to FIG. 8, the first reception trace line TL_RX1 may overlap the first transmission sensor electrode SE_TX1 and/or the second reception sensor electrode SE_RX2 that is disposed in the sensor metal layer and should be electrically separated. Accordingly, the first reception trace line TL_RX1 should be disposed in a bridge metal layer different from the sensor metal layer. In other words, the first reception trace line TL_RX1 may include a bridge metal BM.

The second reception trace line TL_RX2 may overlap the first transmission sensor electrode SE_TX1 and/or the first reception sensor electrode SE_RX1 that may be disposed in the sensor metal layer to be electrically separated. Accordingly, the second reception trace line TL_RX2 should be disposed in a bridge metal layer different from the sensor metal layer. In other words, the second reception trace line TL_RX2 may include a bridge metal BM.

Referring to FIG. 8, the first transmission trace line TL_TX1, the second transmission trace line TL_TX2, and the third transmission trace line TL_TX3 may be disposed in the sensor metal layer or the bridge metal layer. In other words, the first transmission trace line TL_TX1, the second transmission trace line TL_TX2, and the third transmission trace line TL_TX3 may include a sensor metal SM or a bridge metal BM.

For example, in the first non-display area NDA1, when at least one of the first transmission trace line TL_TX1, the second transmission trace line TL_TX2, and the third transmission trace line TL_TX3 crosses and overlaps at least one of the first reception trace line TL_RX1 and the second reception trace line TL_RX2, the first transmission trace line TL_TX1, the second transmission trace line TL_TX2, and the third transmission trace line TL_TX3 should be disposed in a metal layer different from the first reception trace line TL_RX1 and the second reception trace line TL_RX2.

Accordingly, in the first non-display area NDA1, when at least one of the first transmission trace line TL_TX1, the second transmission trace line TL_TX2, and the third transmission trace line TL_TX3 crosses and overlaps at least one of the first reception trace line TL_RX1 and the second reception trace line TL_RX2, the first transmission trace line TL_TX1, the second transmission trace line TL_TX2, and the third transmission trace line TL_TX3 may be disposed in the sensor metal layer. In other words, the first transmission trace line TL_TX1, the second transmission trace line TL_TX2, and the third transmission trace line TL_TX3 may be formed of the sensor metal SM.

Referring to FIGS. 8 and 9, the first sensor electrode SE1 may include a first bridge BRG1 electrically connecting two or more first sub sensor electrodes SUB1a, SUB1b, SUB1c, and SUB1d and two or more first sub sensor electrodes SUB1a, SUB1b, SUB1c, and SUB1d arranged in the second direction. For example, the first sensor electrode SE1 may be a first reception sensor electrode SE_RX1.

Referring to FIGS. 8 and 9, the first trace line TL1 may be electrically connected to the first sensor electrode SE1 and the first pad PD1. One point of the first trace line TL1 may be electrically connected to at least one of two or more first sub sensor electrodes SUB1a, SUB1b, SUB1c, and SUB1d included in the first sensor electrode SE1, and another point of the first trace line TL1 may be electrically connected to the first pad PD1.

Referring to FIG. 8, the second sensor electrode SE2 may include a second bridge BRG2 electrically connecting two or more second sub sensor electrodes SUB2a, SUB2b, SUB2c, and SUB2d and two or more second sub sensor electrodes SUB2a, SUB2b, SUB2c, and SUB2d arranged in the second direction. For example, the second sensor electrode SE2 may be a second reception sensor electrode SE_RX2.

Referring to FIG. 8, the second trace line TL2 may be electrically connected to the second sensor electrode SE2 and the second pad PD2. One point of the second trace line TL2 may be electrically connected to at least one of two or more second sub sensor electrodes SUB2a, SUB2b, SUB2c, and SUB2d included in the second sensor electrode SE2, and another point of the second trace line TL2 may be electrically connected to the second pad PD2.

Referring to FIGS. 8 and 9, the fourth sensor electrode SE4 may be disposed while passing between the two first sub sensor electrodes SUB1a and SUB1b included in the first sensor electrode SE1 and between the two second sub sensor electrodes SUB2a and SUB2b included in the second sensor electrode SE2.

Referring to FIGS. 8 and 9, the fourth sensor electrode SE4 may overlap the first bridge BRG1 and the second bridge BRG2.

The fourth trace line TL4 may electrically connect the fourth pad PD4 disposed in the pad area PA included in the first non-display area NDA1 and the fourth sensor electrode SE4 disposed in the display area DA.

Referring to FIG. 9, the sensor electrodes SE1 and SE4 in the touch sensor included in the display panel 110 according to embodiments of the disclosure may be a mesh-shaped sensor metal SM having openings OA formed therein. Here, the openings OA may overlap the light emitting areas of the subpixels SP.

In this case, the first trace line TL1 connected to the first sensor electrode SE1 and/or the first bridge BRG1 included in the first sensor electrode SE1 may be disposed along the mesh-shaped sensor metal SM constituting the first sensor electrode SE1. In other words, the first bridge BRG1 may be disposed while being bent or curved along the mesh-shaped sensor metal SM of the fourth sensor electrode SE4.

Accordingly, the first trace line TL1 connected to the first sensor electrode SE1 and/or the first bridge BRG1 included in the first sensor electrode SE1 may vertically overlap the mesh-shaped sensor metal SM constituting the first sensor electrode SE1.

Accordingly, the openings OA formed in the first sensor electrode SE1 and the fourth sensor electrode SE4 are not covered by the first trace line TL1 and/or the first bridge BRG1, so that the light emitting areas of the subpixels SP may be increased and the light emitting efficiency may be enhanced.

Figure 10A:
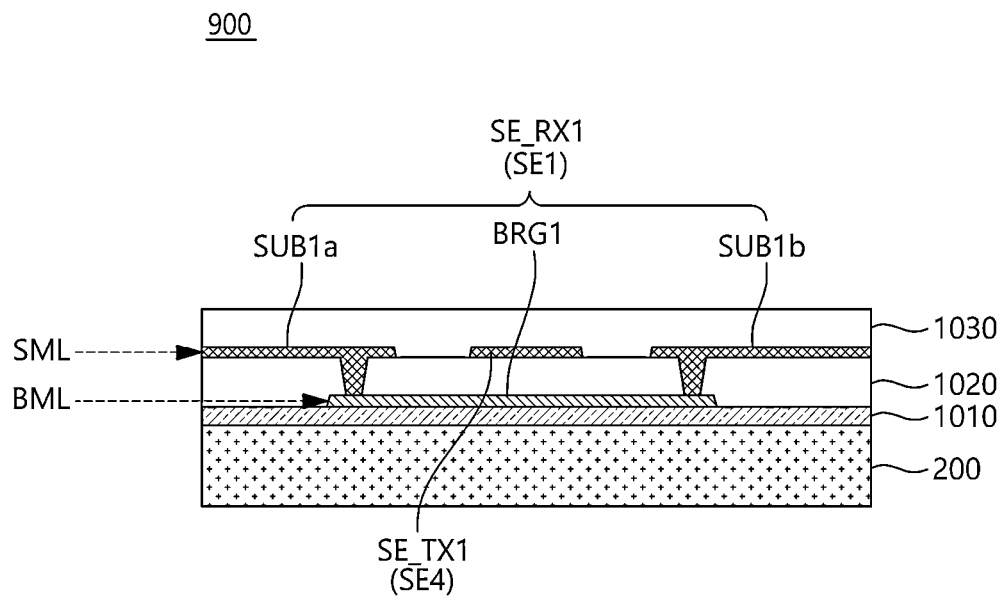
FIG. 10A illustrates a stacked structure of a sensor electrode and a bridge in a touch sensor included in a display panel according to embodiments of the disclosure.
Figure 10B:
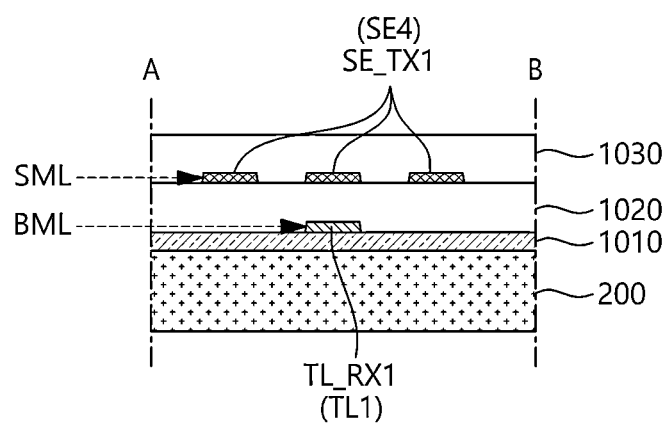
FIG. 10B illustrates a stacked structure of a sensor electrode and a trace line in a touch sensor included in a display panel according to embodiments of the disclosure.

FIG. 10A illustrates a stacked structure of sensor electrodes SE1 and SE4 and a bridge BRG1 in a touch sensor included in a display panel 110 according to embodiments of the disclosure, and FIG. 10B illustrates a stacked structure of a sensor electrode SE4 and a trace line TL1 in a touch sensor included in a display panel 110 according to embodiments of the disclosure. In the following description, a reference may also be made to FIGS. 3 and 8.

FIG. 10A illustrates a vertical cross-sectional structure of an area 900 in which the first bridge BRG1 of FIG. 9 is formed, and FIG. 10B illustrates a vertical cross-sectional structure taken along line A-B of FIG. 9.

Referring to FIGS. 10A and 10B, the touch sensor may be formed on the encapsulation layer 200.

Referring to FIGS. 10A and 10B, a touch buffer film 1010 may be disposed on the encapsulation layer 200, and a bridge metal layer BML may be disposed on the touch buffer film 1010.

The touch interlayer insulation film 1020 may be disposed on the bridge metal layer BML, and the sensor metal layer SML may be disposed on the touch interlayer insulation film 1020.

A touch protective film 1030 may be disposed on the sensor metal layer SML.

In the examples of FIGS. 10A and 10B, the sensor metal layer SML is positioned on the bridge metal layer BML. Alternatively, the bridge metal layer BML may be positioned on the sensor metal layer SML.

Referring to FIG. 10A, two or more first sub sensor electrodes SUB1a, SUB1b, SUB1c, and SUB1d and a fourth sensor electrode SE4 included in the first sensor electrode SE1 may be disposed on the sensor metal layer SML. In other words, the two or more first sub sensor electrodes SUB1a, SUB1b, SUB1c, and SUB1d and the fourth sensor electrode SE4 included in the first sensor electrode SE1 may include the sensor metal SM.

The first bridge BRG1 may electrically connect two or more first sub sensor electrodes SUB1a, SUB1b, SUB1c, and SUB1d included in the first sensor electrode SE1. The first bridge BRG1 may be positioned in the bridge metal layer BML, which is a metal layer different from the sensor metal layer SML. In other words, the first bridge BRG1 may include a bridge metal BM.

As described above, the two or more second sub sensor electrodes SUB2a, SUB2b, SUB2c, and SUB2d included in the second sensor electrode SE2 may also be disposed in the sensor metal layer SML and include the sensor metal SM. The second bridge BRG2 electrically connecting the two or more second sub sensor electrodes SUB2a, SUB2b, SUB2c, and SUB2d included in the second sensor electrode SE2 may be disposed in the bridge metal layer BML and may include the bridge metal BM.

Referring to FIG. 10B, the first trace line TL1 may be electrically connected to at least one of two or more first sub sensor electrodes SUB1a, SUB1b, SUB1c, and SUB1d included in the first sensor electrode SE1. In the display area DA, the first trace line TL1 may be disposed in the bridge metal layer BML. In other words, in the display area DA, the first trace line TL1 may include a bridge metal BM.

The first trace line TL1 may overlap the first sensor electrode SE1 while being electrically connected to the first sensor electrode SE1. The first trace line TL1 may overlap the fourth sensor electrode SE4 while being electrically separated from the fourth sensor electrode SE4.

The second trace line TL2 may be electrically connected to at least one of two or more second sub sensor electrodes SUB2a, SUB2b, SUB2c, and SUB2d included in the second sensor electrode SE2. In the display area DA, the second trace line TL2 may be disposed in the bridge metal layer BML. In other words, in the display area DA, the second trace line TL2 may include a bridge metal BM.

The second trace line TL2 may overlap the second sensor electrode SE2 while being electrically connected to the second sensor electrode SE2. The second trace line TL2 may overlap the fourth sensor electrode SE4 while being electrically separated from the fourth sensor electrode SE4.

The fourth trace line TL4 electrically connected to the fourth sensor electrode SE4 crossing the first sensor electrode SE1 and the second sensor electrode SE2 may include a sensor metal SM or a bridge metal BM.

Figure 11:
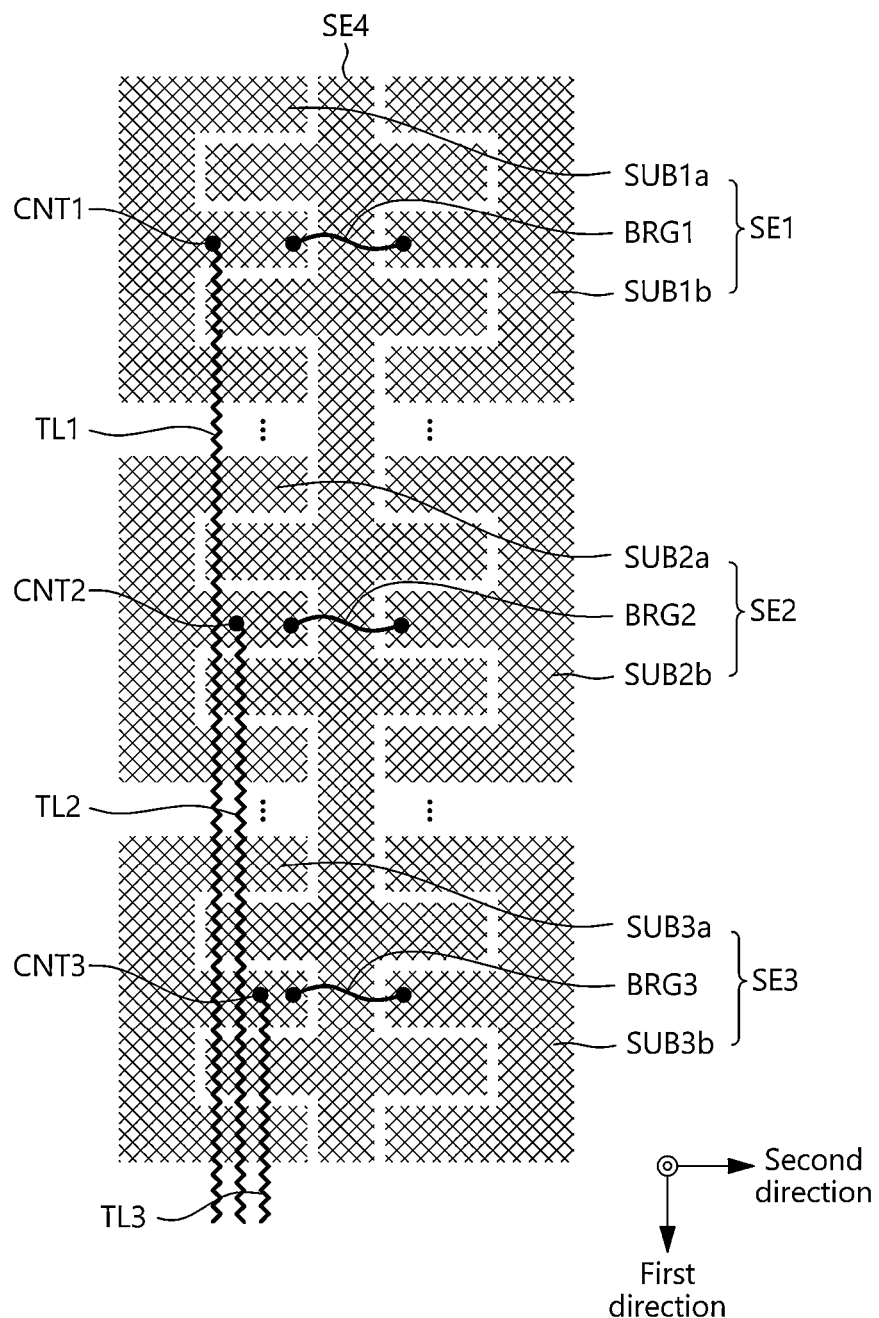
FIGS. 11, 12, and 13 are plan views illustrating examples of a trace line structure in a touch sensor included in a display panel according to embodiments of the disclosure.
Figure 12:
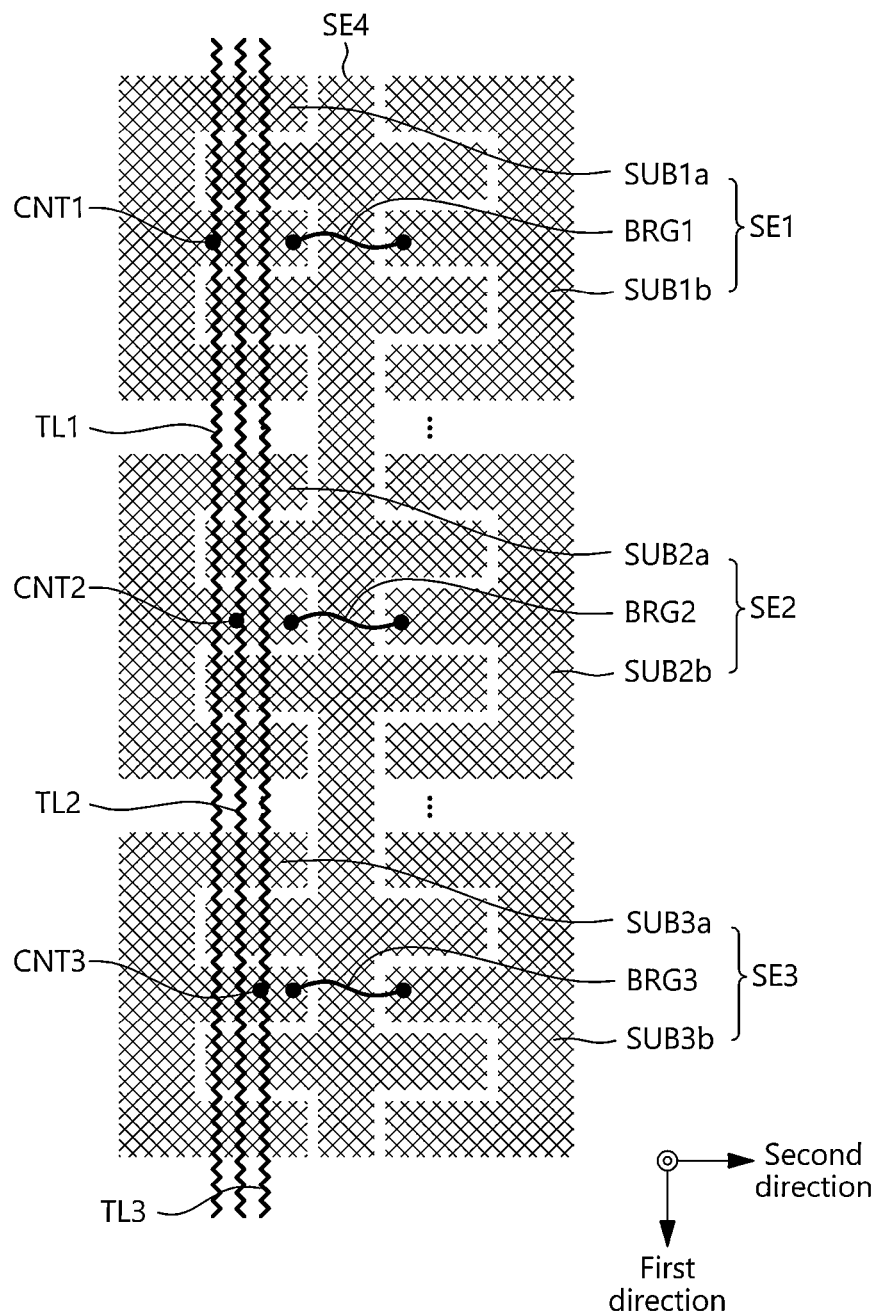
Figure 13:
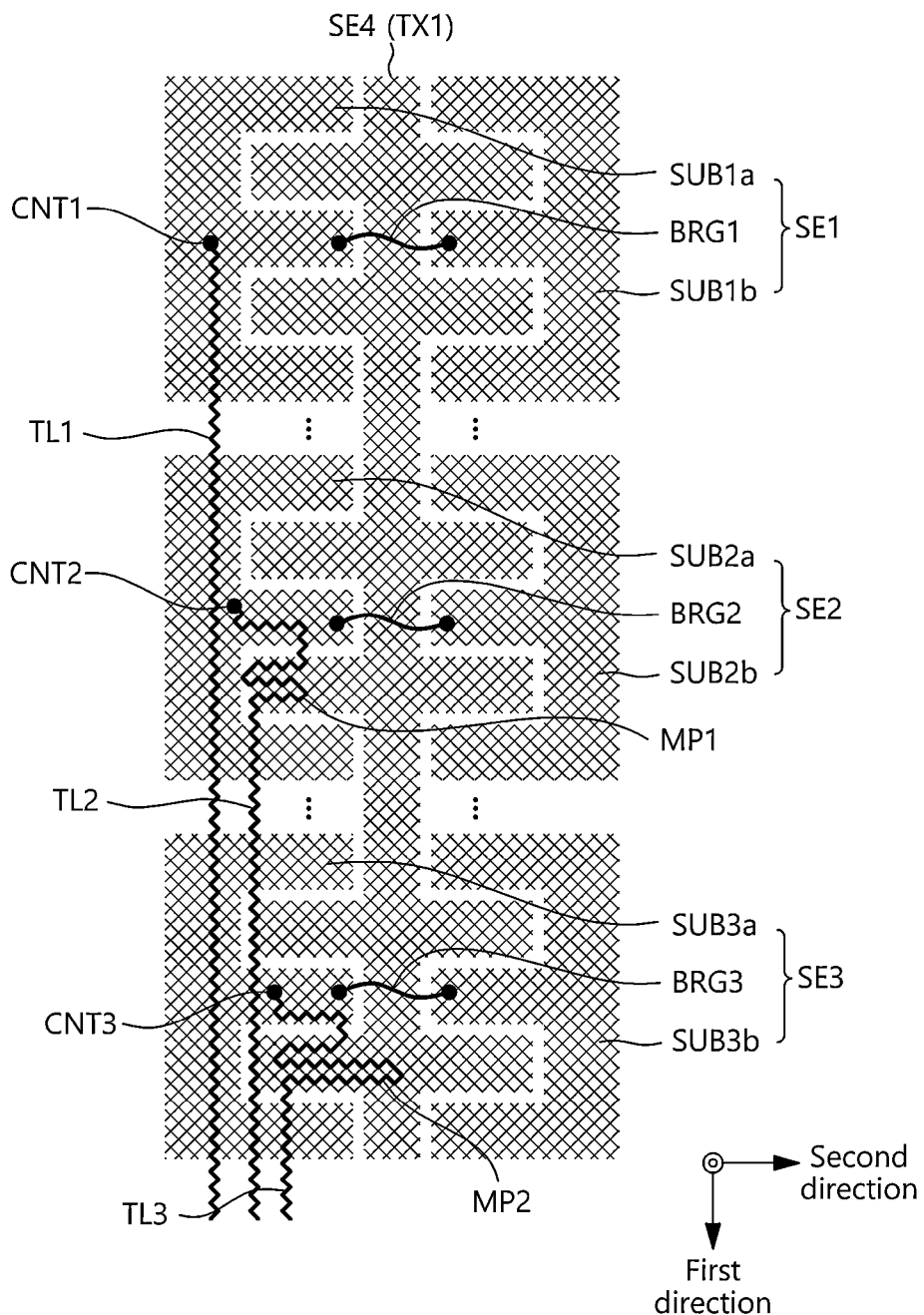

FIGS. 11, 12, and 13 are plan views illustrating examples of a trace line TL structure in a touch sensor included in a display panel 110 according to embodiments of the disclosure. In the following description, a reference is also made to FIG. 3.

FIGS. 11 to 13 illustrate a portion of each of a first sensor electrode SE1, a second sensor electrode SE2, a third sensor electrode SE3, and a fourth sensor electrode SE4.

Referring to FIGS. 11 to 13, the first sensor electrode SE1 may include a plurality of first sub sensor electrodes SUB1a and SUB1b electrically connected by the first bridge BRG1. The second sensor electrode SE2 may include a plurality of second sub sensor electrodes SUB2a and SUB2b electrically connected by the second bridge BRG2. The third sensor electrode SE3 may include a plurality of third sub sensor electrodes SUB3a and SUB3b electrically connected by the third bridge BRG3.

Referring to FIGS. 11 to 13, the fourth sensor electrode SE4 may pass between the plurality of first sub sensor electrodes SUB1a and SUB1b, between the plurality of second sub sensor electrodes SUB2a and SUB2b, and between the plurality of third sub sensor electrodes SUB3a and SUB3b.

Referring to FIGS. 11 to 13, the fourth sensor electrode SE4 may overlap a first bridge BRG1 electrically connecting the plurality of first sub sensor electrodes SUB1a and SUB1b, a second bridge BRG2 electrically connecting the plurality of second sub sensor electrodes SUB2a and SUB2b, and a third bridge BRG3 electrically connecting the plurality of third sub sensor electrodes SUB3a and SUB3b.

Referring to FIGS. 11 to 13, the plurality of first sub sensor electrodes SUB1a and SUB1b included in the first sensor electrode SE1, the plurality of second sub sensor electrodes SUB2a and SUB2b included in the second sensor electrode SE2, and the plurality of third sub sensor electrodes SUB3a and SUB3b included in the third sensor electrode SE3 may be disposed in the sensor metal layer SML.

In other words, the first sub sensor electrodes SUB1a and SUB1b, the second sub sensor electrodes SUB2a and SUB2b, and the third sub sensor electrodes SUB3a and SUB3b may include a sensor metal SM formed in the sensor metal layer SML.

Referring to FIGS. 11 to 13, the fourth sensor electrode SE4 may also be disposed in the sensor metal layer SML. In other words, the fourth sensor electrode SE4 may also include a sensor metal SM formed on the sensor metal layer SML.

Referring to FIGS. 11 to 13, the first bridge BRG1, the second bridge BRG2, and the third bridge BRG3 may be disposed in the bridge metal layer BML, which is a layer different from the sensor metal layer SML. In other words, the first bridge BRG1, the second bridge BRG2, and the third bridge BRG3 may include a bridge metal BM formed in the bridge metal layer BML.

Referring to FIGS. 11 to 13, the first trace line TL1 may be electrically connected to at least one (e.g., SUB1a) of the first sub sensor electrodes SUB1a and SUB1b. The second trace line TL2 may be electrically connected to at least one (e.g., SUB2a) of the second sub sensor electrodes SUB2a and SUB2b. The third trace line TL3 may be electrically connected to at least one (e.g., SUB3a) of the third sub sensor electrodes SUB3a and SUB3b.

Referring to FIGS. 11 to 13, the first trace line TL1, the second trace line TL2, and the third trace line TL3 may be disposed on the bridge metal layer BML, which is a metal layer different from the sensor metal layer SML. In other words, the first trace line TL1, the second trace line TL2, and the third trace line TL3 may include a bridge metal BM formed in the bridge metal layer BML.

Referring to FIGS. 11 to 13, at least one of the first trace line TL1, the second trace line TL2, and the third trace line TL3 may overlap the fourth sensor electrode SE4.

Referring to FIGS. 11 to 13, the first sensor electrode SE1, the second sensor electrode SE2, and the third sensor electrode SE3 may be reception sensor electrodes SE_RX, and the fourth sensor electrode SE4 may be a transmission sensor electrode SE_TX.

Conversely, the first sensor electrode SE1, the second sensor electrode SE2, and the third sensor electrode SE3 may be transmission sensor electrodes SE_TX, and the fourth sensor electrode SE4 may be a reception sensor electrodes SE_RX.

According to the trace structure of FIG. 11, each trace line TL may be disposed from the pad area PA to the contact hole CNT electrically connected to the corresponding sensor electrode SE. Accordingly, each trace line TL may overlap at least one sensor electrode SE positioned on the path where it is disposed.

Referring to FIG. 11, the first trace line TL1 may be disposed from the pad area PA to the first contact hole CNT1 electrically connected to the first sensor electrode SE1. Accordingly, the first trace line TL1 may not only overlap the first sensor electrode SE1 electrically connected to the first trace line TL1, but may also overlap the second sensor electrode SE2 and the third sensor electrode SE3 not electrically connected to the first trace line TL1.

Referring to FIG. 11, the second trace line TL2 may be disposed from the pad area PA to the second contact hole CNT2 electrically connected to the second sensor electrode SE2. Accordingly, the second trace line TL2 may not only overlap the second sensor electrode SE2 electrically connected to the second trace line TL2, but may also overlap the third sensor electrode SE3 not electrically connected to the second trace line TL2.

Referring to FIG. 11, the third trace line TL3 may be disposed from the pad area PA to the third contact hole CNT3 electrically connected to the third sensor electrode SE3. Accordingly, the third trace line TL3 may not only overlap the third sensor electrode SE3 electrically connected to the third trace line TL3, but may also overlap another sensor electrode SE that is not electrically connected to the third trace line TL3.

The trace structure of FIG. 12 is a parasitic capacitance equivalent design structure by each trace line TL. According to the trace structure of FIG. 12, each trace line TL may be disposed to extend from the pad area PA across the display area DA to the opposite end of the pad area PA, and may be electrically connected to the corresponding sensor electrode SE in the corresponding contact hole CNT. Accordingly, each trace line TL may overlap all of the plurality of sensor electrodes SE positioned on the path where it is disposed.

Referring to FIG. 12, the first trace line TL1 may be disposed to extend from the pad area PA across the display area DA to the opposite end of the pad area PA, and may be electrically connected to the first sensor electrode SE1 in the first contact hole CNT1. Accordingly, the first trace line TL1 may not only overlap the first sensor electrode SE1 electrically connected to the first trace line TL1, but may also overlap the second sensor electrode SE2 and the third sensor electrode SE3 not electrically connected to the first trace line TL1.

Referring to FIG. 12, the second trace line TL2 may be disposed to extend from the pad area PA across the display area DA to the opposite end of the pad area PA, and may be electrically connected to the second sensor electrode SE2 in the second contact hole CNT2. Accordingly, the second trace line TL2 may not only overlap the second sensor electrode SE2 electrically connected to the second trace line TL2, but also overlap the first sensor electrode SE1 and the third sensor electrode SE3 not electrically connected to the second trace line TL2. Here, the first sensor electrode SE1 may be a sensor electrode SE positioned between the opposite end of the pad area PA and the second contact hole CNT2.

Referring to FIG. 12, the third trace line TL3 may be disposed to extend from the pad area PA across the display area DA to the opposite end of the pad area PA, and may be electrically connected to the third sensor electrode SE3 in the third contact hole CNT3. Accordingly, the third trace line TL3 may not only overlap the third sensor electrode SE3 electrically connected to the third trace line TL3, but may also overlap the first sensor electrode SE1 and the second sensor electrode SE2 not electrically connected to the third trace line TL3. Here, the first sensor electrode SE1 and the second sensor electrode SE2 may be sensor electrodes SE positioned between the opposite end of the pad area PA and the third contact hole CNT3.

According to the trace structure of FIG. 12, a parasitic capacitance deviation due to each of the first trace line TL1, the second trace line TL2, and the third trace line TL3 may be reduced.

The trace structure of FIG. 13 is a design structure equivalent to the load value by each trace line TL. Here, the load value may refer to a resistance-capacitance (RC) value obtained by multiplying the resistance and capacitance.

According to the trace structure of FIG. 13, each trace line TL may be disposed from the pad area PA to the contact hole CNT electrically connected to the corresponding sensor electrode SE. Accordingly, each trace line TL may overlap at least one sensor electrode SE positioned on the path where it is disposed.

Referring to FIG. 13, the first trace line TL1 may be disposed from the pad area PA to the first contact hole CNT1 across the display area DA and is electrically connected to the first sensor electrode SE1. Accordingly, the first trace line TL1 may not only overlap the first sensor electrode SE1 electrically connected to the first trace line TL1, but may also overlap the second sensor electrode SE2 and the third sensor electrode SE3 not electrically connected to the first trace line TL1.

Referring to FIG. 13, the second trace line TL2 may be disposed from the pad area PA to the second contact hole CNT2 across the display area DA to electrically connect to the second sensor electrode SE2. Accordingly, the second trace line TL2 may not only overlap the second sensor electrode SE2 electrically connected to the second trace line TL2, but may also overlap the third sensor electrode SE3 that is not electrically connected to the second trace line TL2 and without overlapping the first sensor electrode SE1.

Referring to FIG. 13, the third trace line TL3 may be disposed from the pad area PA to the third contact hole CNT3 across the display area DA to electrically connect to the third sensor electrode SE3. Accordingly, the third trace line TL3 may not only overlap the third sensor electrode SE3 electrically connected to the third trace line TL3, but may also overlap another sensor electrode SE that is not electrically connected to the third trace line TL3 without overlapping the first sensor electrode SE1 and the second sensor electrode SE3.

Referring to FIG. 13, the second trace line TL2 may include a first meandering portion MP1. At least a portion of the first meandering portion MP1 may overlap the area occupied by the second sensor electrode SE2.

For example, the first meandering portion MP1 present in the second trace line TL2 may be a meandering line portion in the second trace line TL2, a bent line portion in the second trace line TL2, or a twisted line portion in the second trace line TL2, and may also be referred to as a curved portion or a bent portion. That is, the first meandering portion MP1 includes a plurality of parts that each extend along one of the first direction, the second direction, or a third direction that is different from the first direction and the second direction in the display area DA.

Accordingly, as the length of the second trace line TL2 is compensated, the deviation between the load value by the second trace line TL2 and the load value by the first trace line TL1 may be reduced. The second sensor electrode SE2 may have a load value corresponding to the load value of the first sensor electrode SE1 by the first meandering portion MP1 of the second trace line TL2.

For example, when the capacitance (parasitic capacitance) between the second trace line TL2 and the peripheral electrodes (e.g., SE3) is the same as the capacitance (parasitic capacitance) between the first trace line TL1 and the peripheral electrodes (e.g., SE2 and SE3), if the resistance of the second trace line TL2 is the same (e.g., substantially matches) as the resistance of the first trace line TL1, the load value by the second trace line TL2 and the load value by the first trace line TL1 may be the same. According to the wiring design for compensating for the resistance of the second trace line TL2 to be the same as the resistance of the first trace line TL1, the total length of the second trace line TL2 in the display area DA may be the same as or similar to the total length of the first trace line TL1 by the meandering portion MP1.

As another example, as illustrated in FIG. 13, when the first contact hole CNT1 is further away from the pad area PA than the second contact hole CNT2, the capacitance (parasitic capacitance) between the second trace line TL2 and the peripheral electrodes (e.g., SE3) may be smaller than the capacitance (parasitic capacitance) between the first trace line TL1 and the peripheral electrodes (e.g., SE2 and SE3). In this case, when the resistance of the second trace line TL2 becomes larger than the resistance of the first trace line TL1, the load value by the second trace line TL2 and the load value by the first trace line TL1 may be the same or substantially the same. According to a design for making the resistance of the second trace line TL2 larger than the resistance of the first trace line TL1, the total length of the second trace line TL2 in the display area DA may be larger than the total length of the first trace line TL1 by the meandering portion MP1.

Referring to FIG. 13, the first trace line TL1 may not include a meandering portion. Alternatively, the first trace line TL1 may include a meandering portion. When the first trace line TL1 includes the meandering portion, the length of the meandering portion when the meandering portion of the first trace line TL1 is straightened may be shorter than the length of the first meandering portion MP1 when the first meandering portion MP1 of the second trace line TL2 is straightened.

Referring to FIG. 13, the third trace line TL3 may include a second meandering portion MP2. The second meandering portion MP2 may be disposed in the area occupied by the third sensor electrode SE3.

For example, the second meandering portion MP2 present in the third trace line TL3 may be a meandering line portion in the third trace line TL3, a bent line portion in the third trace line TL3, or a twisted line portion in the third trace line TL3.

The third sensor electrode SE3 may be positioned closer to the pad area PA than the second sensor electrode SE2. Considering this, the length of the second meandering portion MP2 when the second meandering portion MP2 of the third trace line TL3 is straightened may be larger than the length of the first meandering portion MP1 when the first meandering portion MP1 of the second trace line TL2 is straightened.

Referring to FIG. 13, the first meandering portion MP1 of the second trace line TL2 may overlap the fourth sensor electrode SE4. The second meandering portion MP2 of the third trace line TL3 may overlap the fourth sensor electrode SE4.

Figure 14:
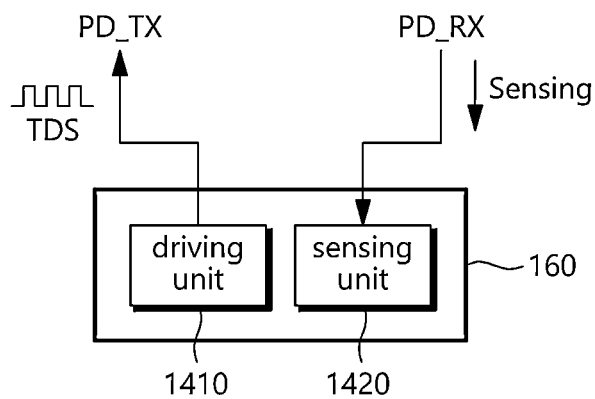
FIG. 14 illustrates a touch driving circuit according to embodiments of the disclosure.

FIG. 14 illustrates a touch driving circuit 160 according to embodiments of the disclosure.

Referring to FIG. 14, the touch driving circuit 160 according to embodiments of the disclosure may include a driving unit 1410 (e.g., a circuit) configured to output a touch driving signal TDS whose voltage level changes to at least one of the plurality of transmission pads PD_TX and a sensing unit 1420 (e.g., a circuit) configured to sense at least one of the plurality of reception pads PD_RX.

For example, the driving unit 1410 may include an output buffer including an amplifier or the like.

For example, the sensing unit 1420 may include at least one charge amplifier including an operational amplifier and a feedback capacitor, and an analog-to-digital converter. For example, the sensing unit 1420 may further include at least one integrator for integrating the output signals of at least one charge amplifier.

For example, the sensing unit 1420 may further include a first selection circuit for selecting at least one of a plurality of transmission pads PD_TX. The first selection circuit may include a switch circuit, a multiplexer circuit, or the like.

For example, the sensing unit 1420 may further include a sample and hold circuit for storing a plurality of integral values output from the plurality of integrators, and a second selection circuit for selecting at least one of the plurality of integral values stored in the sample and hold circuit and providing the selected integral value to an analog-to-digital converter. The second selection circuit may include a switch circuit, a multiplexer circuit, or the like.

The touch driving circuit 160 may further include a signal generator for generating the touch driving signal TDS.

Figure 15:
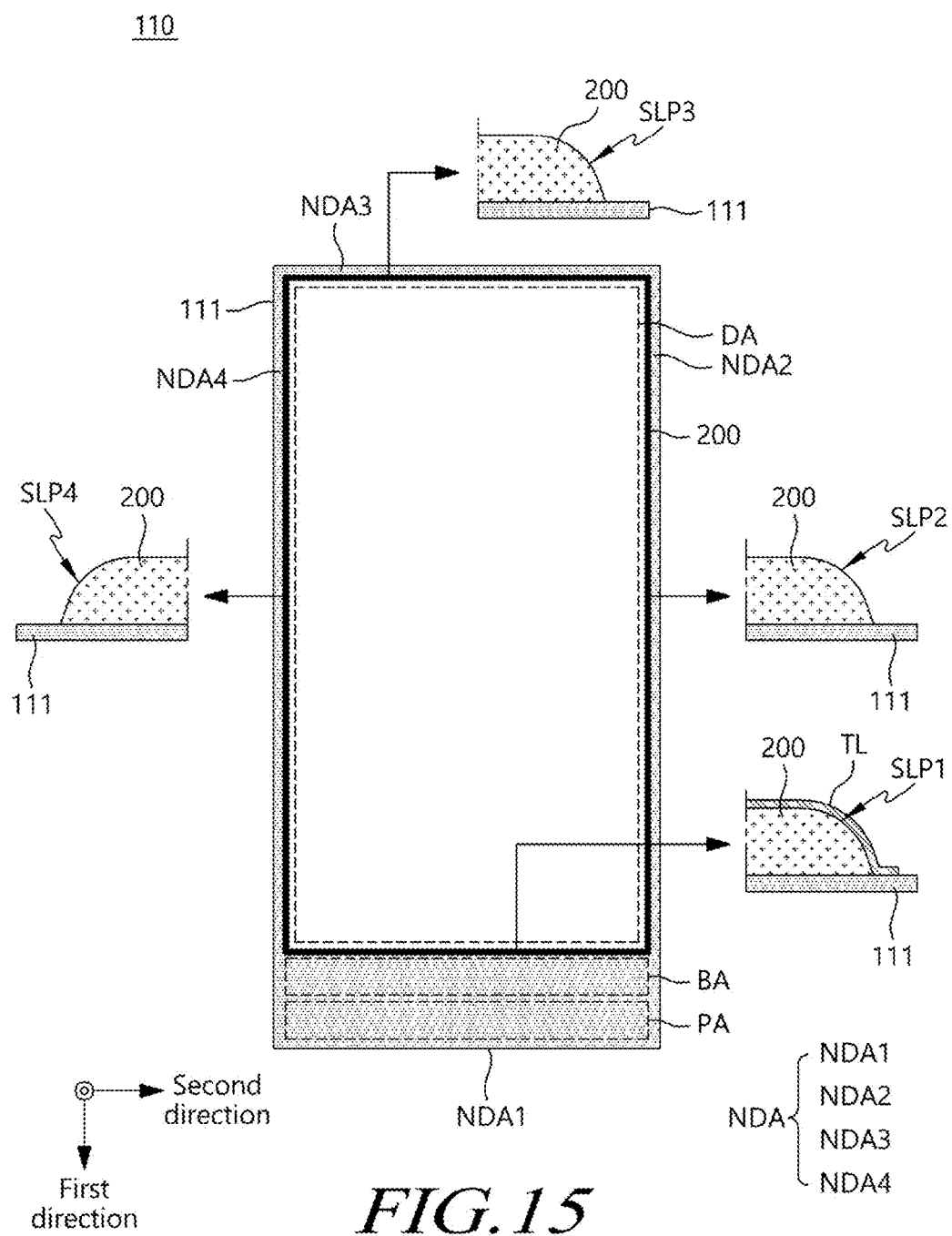
FIG. 15 is a plan view illustrating a substrate and an encapsulation layer according to embodiments of the disclosure.

FIG. 15 is a plan view illustrating a substrate 111 and an encapsulation layer 200 according to embodiments of the disclosure. In the following description, a reference is also made to FIG. 3.

A display panel 110 according to embodiments of the disclosure may include a substrate 111 including a display area DA in which a plurality of subpixels SP are disposed and a non-display area NDA including a pad area PA positioned in a first direction from the display area DA, a light emitting element ED disposed on the substrate 111 positioned in the display area DA, an encapsulation layer 200 disposed on the light emitting element ED, a first sensor electrode SE1 positioned in the display area DA and disposed on the encapsulation layer 200, a second sensor electrode SE2 positioned in the display area DA and disposed on the encapsulation layer 200, a first pad PD1 disposed in the pad area PA, a second pad PD2 disposed in the pad area PA, a first trace line TL1 electrically connecting the first sensor electrode SE1 and the first pad PD1 and extending across the display area DA to the pad area PA in the first direction, and a second trace line TL2 electrically connecting the second sensor electrode SE2 and the second pad PD2 and extending across the display area DA to the pad area PA in the first direction.

Referring to FIG. 15, the non-display area NDA may include a first non-display area NDA1 (e.g., a first part) positioned in the first direction from the display area DA, a second non-display area NDA2 (e.g., a second part) positioned in the second direction from the display area DA, a third non-display area NDA3 (e.g., a third part) positioned in a direction opposite to the first direction from the display area DA, and a fourth non-display area NDA4 (e.g., a fourth part) positioned in a direction opposite to the second direction from the display area DA.

Referring to FIG. 15, the encapsulation layer 200 may be disposed in the display area DA and may extend to a partial area of the non-display area NDA.

Referring to FIG. 15, the encapsulation layer 200 may include a first inclined surface SLP1 positioned outside in the first direction with respect to a center, a second inclined surface SLP2 positioned outside in the second direction crossing the first direction with respect to the center, a third inclined surface SLP3 positioned outside in a direction opposite to the first direction with respect to the center, and a fourth inclined surface SLP4 positioned outside in a direction opposite to the second direction with respect to the center. The term 'center' in the embodiment refers to, for example, the center of the display panel, the substrate or the display area. That is, the encapsulation layer 200 includes the first inclined surface SLP1 at a first part of the non-display area (e.g., NDA1) that is adjacent to a first side of the display area DA that extends in the second direction, a second inclined surface SLP2 at a second part of the non-display area NDA2 that is adjacent to a second side of the display area DA that extends in the first direction, a third inclined surface SLP3 at a third part of the non-display area NDA3 that is adjacent to a third side of the display area that extends in the second direction and is spaced apart from the first side of the display area DA in the first direction, and a fourth inclined surface SLP4 at a fourth part of the non-display area NDA4 that is adjacent to a fourth side of the display area DA that extends in the first direction and is spaced apart from the second side of the display area DA in the second direction.

The first inclined surface SLP1, the second inclined surface SLP2, the third inclined surface SLP3, and the fourth inclined surface SLP4 of the encapsulation layer 200 may be positioned in the non-display area NDA.

Among the first inclined surface SLP1, the second inclined surface SLP2, the third inclined surface SLP3, and the fourth inclined surface SLP4 of the encapsulation layer 200, a metal (e.g., a trace line) may not be disposed on the second inclined surface SLP2 and the fourth inclined surface SLP4, and a trace line TL including the first trace line TL1, disposed to extend in the first direction, may pass on the first inclined surface SLP1. That is, the trace lines (e.g., TL1, TL2, and so on) overlap the first inclined surface SLP1 without overlapping the remaining inclines surfaces SLP2 to SLP4.

For example, in the case of the touch sensors of FIGS. 3, 4, and 5, trace lines extending in the first direction, including the first trace line TL1 on the first slope SLP1, may be reception trace lines TL_RX.

As another example, in the case of the touch sensor of FIG. 6, trace lines extending in the first direction, including the first trace line TL1 on the first inclined surface SLP1, may be transmission trace lines TL_TX.

Referring to FIG. 15, the first non-display area NDA1 may include the pad area PA. For example, the pad area PA may include pads to which the driving circuit is electrically connected, or may include pads to which a circuit film or printed circuit board on which the driving circuit is mounted is electrically connected. For example, the driving circuit may include a touch driving circuit 160. The driving circuit may further include the data driving circuit 120.

For example, when the driving circuit is of a chip on glass (COG) type, the pad area PA may include pads to which the driving circuit is electrically connected. As another example, when the driving circuit is of a chip on film (COF) type, the pad area PA may include pads to which the circuit film (also referred to as a flexible printed circuit (FPC)) on which the driving circuit is mounted is electrically connected.

Referring to FIG. 15, the first non-display area NDA1 may further include a bending area BA. In this case, the substrate 111 may be a flexible substrate. In some cases, the first non-display area NDA1 may not include the bending area BA.

Figure 16:
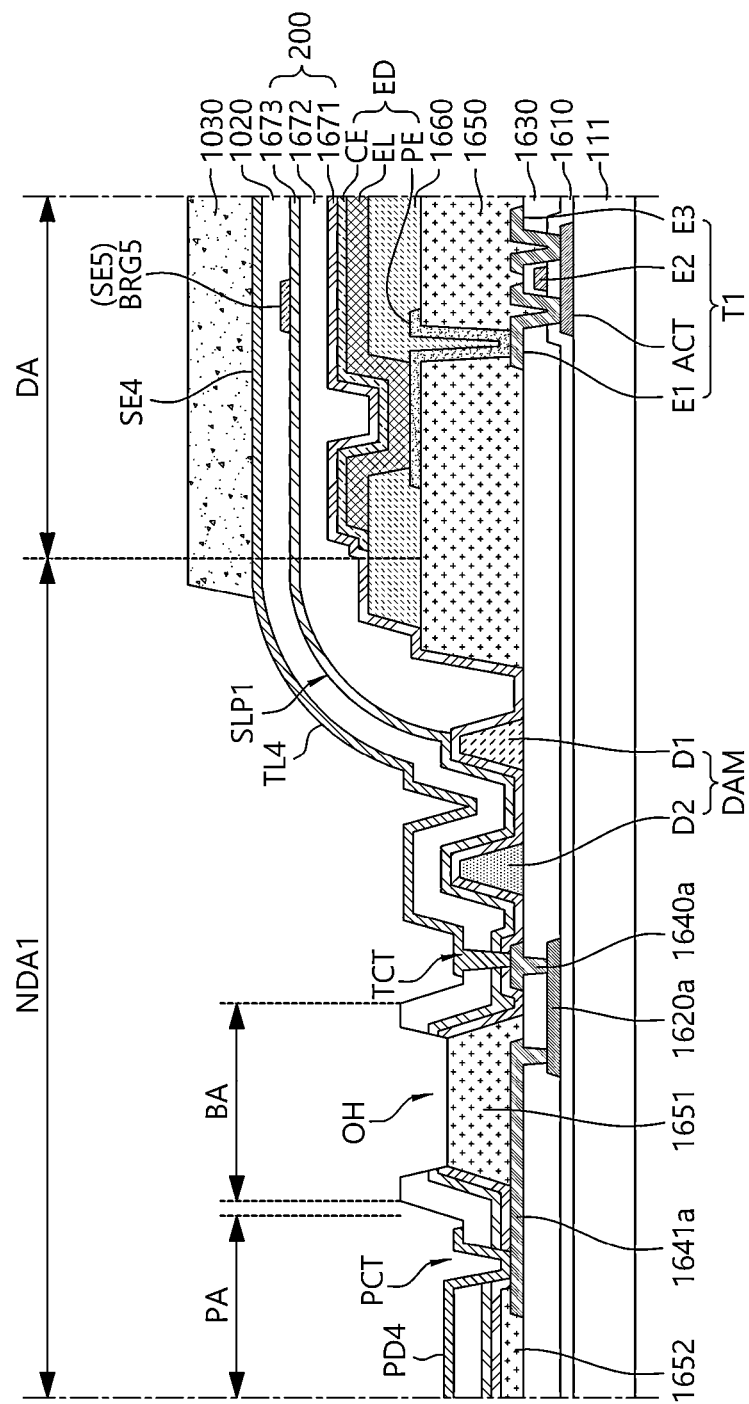
FIGS. 16, 17, and 18 are cross-sectional views illustrating main points of a display panel according to embodiments of the disclosure.
Figure 17:
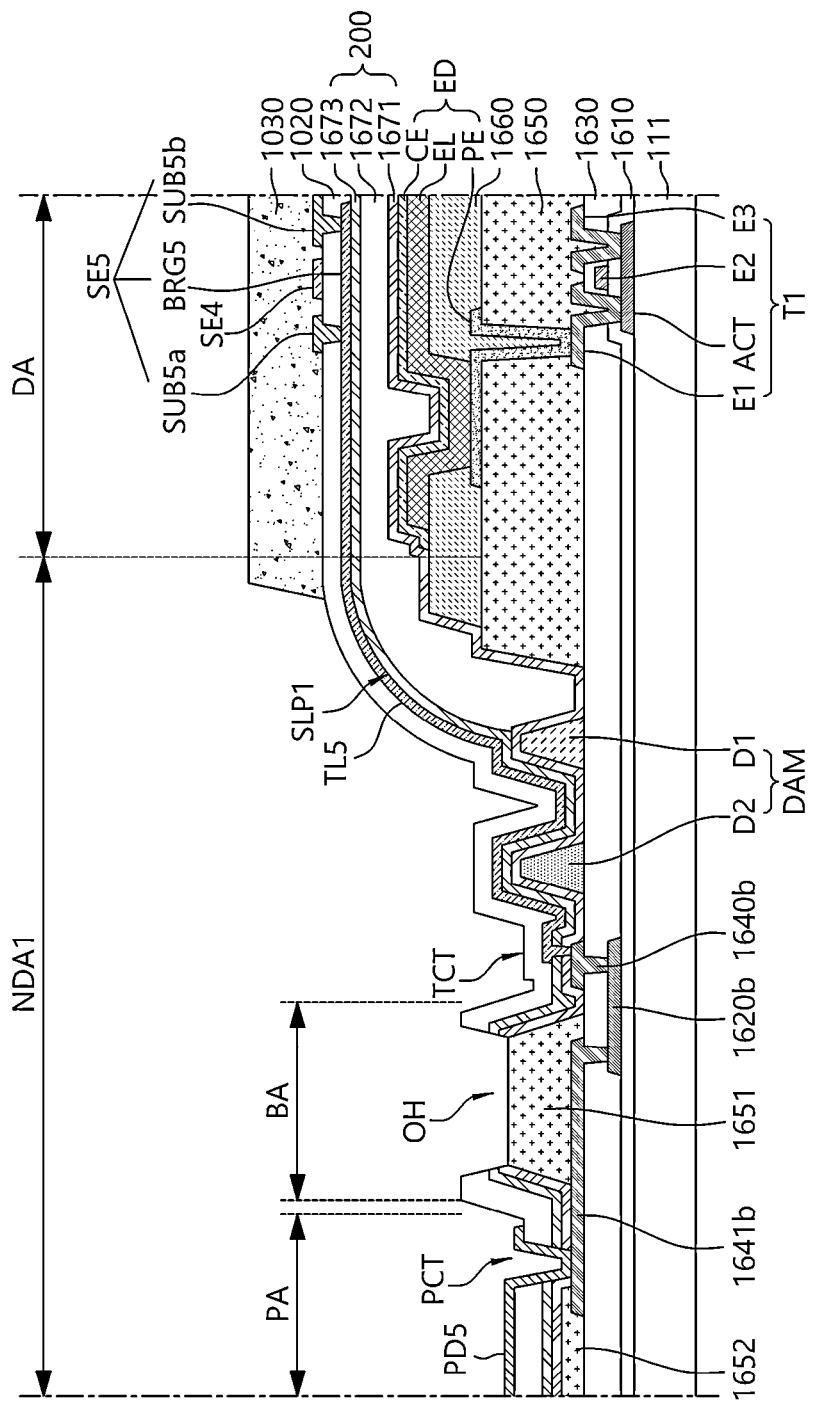
Figure 18:
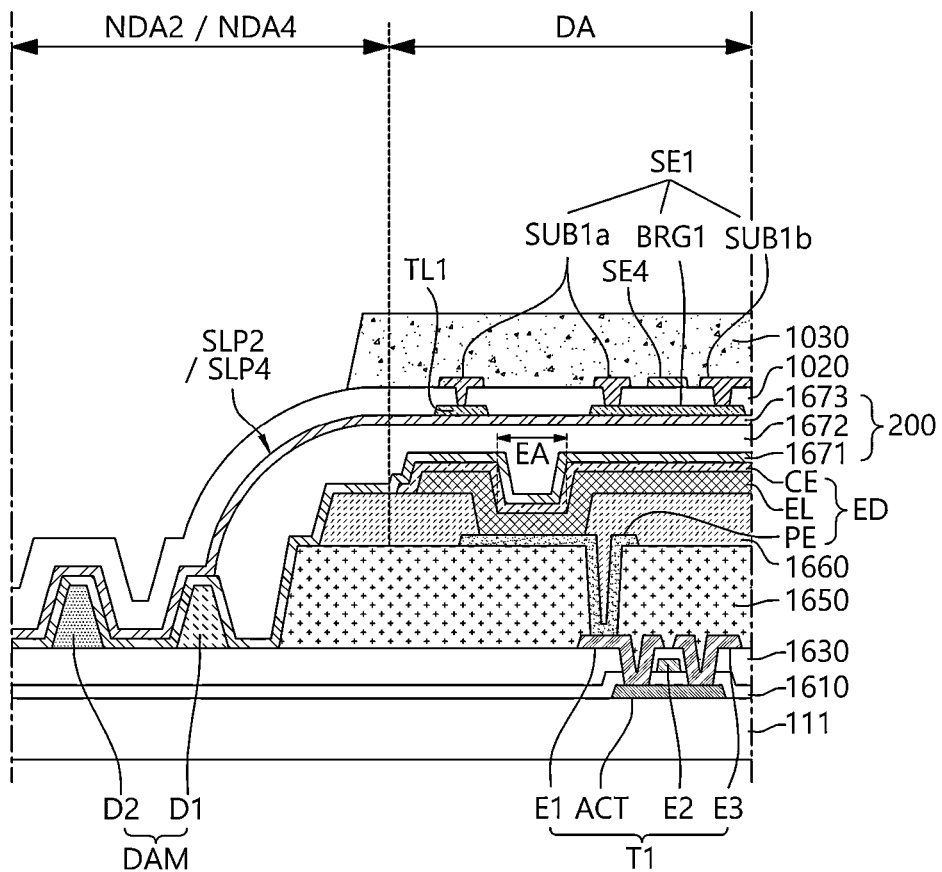

FIGS. 16, 17, and 18 are cross-sectional views illustrating main points of a display panel 110 according to embodiments of the disclosure. However, FIGS. 16 to 18 illustrate an example in which a bending area BA is included in the first non-display area NDA1.

FIGS. 16 and 17 are cross-sectional views illustrating an area including the first non-display area NDA1 and a portion of the display area DA adjacent thereto. FIG. 16 illustrates a vertical cross-sectional structure for a path in which the fourth sensor electrode SE4 and the fourth pad PD4 are connected through the fourth trace line TL4 in FIG. 3. FIG. 17 illustrates a vertical cross-sectional structure for a path in which the fifth sensor electrode SE5 and the fifth pad PD5 are connected through the fifth trace line TL5 in FIG. 3.

FIG. 18 is a cross-sectional view illustrating an area including the second non-display area NDA2 or the fourth non-display area NDA4 and a portion of the display area DA adjacent thereto. FIG. 18 illustrates a vertical cross-sectional structure for an area where the first sensor electrode SE1 and the first trace line TL1 are connected.

Referring to FIG. 16, a substrate 111 may include a display area DA and a first non-display area NDA1, which is an outer area of the display area DA in the first direction, and the first non-display area NDA1 may include a bending area BA and a pad area PA.

A first transistor T1 may be disposed on the substrate 111. The first transistor T1 may include a first electrode E1, a second electrode E2, a third electrode E3, and an active layer ACT. The second electrode E2 may be a gate electrode, the first electrode E1 may be a source electrode or a drain electrode, and the third electrode E3 may be a drain electrode or a source electrode.

For example, when the first transistor T1 has a coplanar structure, the active layer ACT may be disposed on the substrate 111, the gate insulation film 1610 may be disposed on the active layer ACT, and the second electrode E2 corresponding to the gate electrode may be disposed on the gate insulation film 1610. An interlayer insulation film 1630 may be disposed on the second electrode E2. The first electrode E1 and the third electrode E3 may be disposed on the interlayer insulation film 1630. The first electrode E1 may be connected to a portion of the active layer ACT through a contact hole of the interlayer insulation film 1630. The third electrode E3 may be connected to another portion of the active layer ACT through another contact hole of the interlayer insulation film 1630.

A planarization film 1650 may be disposed on the first transistor T1.

The pixel electrode PE may be disposed on the planarization film 1650. The pixel electrode PE may be connected to the first electrode E1 of the first transistor T1 through a contact hole of the planarization film 1650.

A bank 1660 may be disposed on the pixel electrode PE. The bank 1660 may have an opening in an area in which a light emitting area of the light emitting element ED of the subpixel SP should be formed.

An element intermediate layer EL may be disposed on the bank 1660. A portion of the element intermediate layer EL may be connected to a partial upper surface of the pixel electrode PE through an opening of the bank 1660.

The common electrode CE may be disposed on the element intermediate layer EL.

An encapsulation layer 200 may be disposed on the common electrode CE. The encapsulation layer 200 may be a single film or a multi-layer film.

For example, when the encapsulation layer 200 includes multiple films, the encapsulation layer 200 may have a structure in which an inorganic film and an organic film are alternately stacked. For example, the encapsulation layer 200 may include a first encapsulation layer 1671, a second encapsulation layer 1672, a third encapsulation layer 1673, and the like, and the first encapsulation layer 1671 and the third encapsulation layer 1673 may be inorganic films, and the second encapsulation layer 1672 may be organic films. The second encapsulation layer 1672 may be thicker than the first encapsulation layer 1671 and the third encapsulation layer 1673.

The encapsulation layer 200 may extend from the display area DA to a partial area of the first non-display area NDA1.

The first encapsulation layer 1671 may be disposed on the common electrode CE, and the first encapsulation layer 1671 may be disposed to cover the common electrode CE. The first encapsulation layer 1671 may cover the common electrode CE and extend to the first non-display area NDA1 to cover at least one dam D1 and D2. The first encapsulation layer 1671 may extend to the pad area PA disposed outside the at least one dam D1 and D2 to overlap the pad PD4.

The second encapsulation layer 1672 may be disposed on the first encapsulation layer 1671. The second encapsulation layer 1672 may be formed to have a sufficient thickness to prevent foreign substances (particles) from penetrating into the common electrode CE and the element intermediate layer EL including an organic material through the first encapsulation layer 1671. The second encapsulation layer 1672 may be formed through a curing process after being applied in a liquid form through an inkjet process.

The third encapsulation layer 1673 may be disposed on the second encapsulation layer 1672. The third encapsulation layer 1673 may be disposed to cover the second encapsulation layer 1672. The third encapsulation layer 1673 may cover the second encapsulation layer 1672, and may extend to the first non-display area NDA1 to cover at least one dam D1 and D2. Further, the third encapsulation layer 1673 may extend to the pad area PA disposed outside the at least one dam D1 and D2 to overlap the pad PD4. In this case, the first encapsulation layer 1671 and the third encapsulation layer 1673 may be formed to have the same end position.

For example, each of the first encapsulation layer 1671 and the third encapsulation layer 1673 may be formed of silicon nitride, aluminum nitride, zirconium nitride, titanium nitride, hafnium nitride, tantalum nitride, silicon oxide, aluminum oxide, or titanium oxide.

For example, the second encapsulation layer 1672 may be formed of an acrylic resin, an epoxy resin, a phenolic resin, a polyamide resin, or a polyimide resin.

A touch sensor may be formed on the encapsulation layer 200. The touch sensor forming layer on the encapsulation layer 200 may include a touch buffer film 1010 (omitted in FIG. 16), a bridge metal layer BML, a touch interlayer insulation film 1020, a sensor metal layer SML, and a touch protective film 1030.

To form a touch sensor, the touch buffer film 1010 may be disposed on the encapsulation layer 200 as illustrated in FIGS. 10A and 10B, and the touch buffer film 1010 may be omitted on the encapsulation layer 200 as illustrated in FIG. 16.

The metal layer directly above the touch buffer film 1010 and the encapsulation layer 200 may be the bridge metal layer BML. The insulation film directly above the bridge metal layer BML may be the touch interlayer insulation film 1020. The metal layer directly above the touch interlayer insulation film 1020 may be the sensor metal layer SML.

According to the example of FIG. 16, a fifth bridge BRG5 formed of a bridge metal BM may be disposed on the encapsulation layer 200. The touch interlayer insulation film 1020 may be disposed on the fifth bridge BRG5. A fourth sensor electrode SE4 formed of the sensor metal SM may be disposed on the touch interlayer insulation film 1020.

Referring to FIG. 16, the portion extending to the first non-display area NDA1 in the fourth sensor electrode SE4 may be the fourth trace line TL4. Accordingly, the fourth trace line TL4 may be formed of a sensor metal SM.

The fourth trace line TL4 may descend along the first inclined surface SLP1 of the encapsulation layer 200 and extend to the pad area PA of the first non-display area NDA1.

The touch protective film 1030 may be disposed on the sensor electrodes SE including the fourth sensor electrode SE4 and the fifth sensor electrode SE5. The touch protective film 1030 may protect the touch sensor and stabilize the characteristics of the display device 100 by blocking a harmful environment from the outside. For example, the touch protective film 1030 may be an organic film. The touch protective film 1030 may be disposed to extend to the non-display area NDA.

The display panel 110 may have a dam area DAM disposed in the non-display area NDA and disposed to surround the display area DA. At least one dam D1 or D2 may be disposed in the dam area DAM.

The at least one dam D1 or D2 may be included in the encapsulation layer 200 and may block the flow of the second encapsulation layer 1672, which may be an organic film. In other words, the at least one dam D1 or D2 may prevent the second encapsulation layer 1672, which may be an organic film, from collapsing. Accordingly, the at least one dam D1 or D2 may prevent the second encapsulation layer 1672, which is an organic film, from being exposed to the outside of the display device 100 or invading the pad area PA.

At least one dam D1 and D2 may be disposed.

The first dam D1 may be disposed near an outer point of the second encapsulation layer 1672 included in the encapsulation layer 200. The first dam D1 may be disposed to surround the outer periphery of the display area DA to primarily block the flow of the second encapsulation layer 1672. Further, the first dam D1 may be disposed between the display area DA and the pad area PA to primarily block the flow of the second encapsulation layer 1672 to prevent the second encapsulation layer 1672 from invading the pad area PA.

The second dam D2 may be disposed to surround the outer periphery of the first dam D1, and may be disposed side by side to be spaced apart from the first dam D1. The second dam D2 may secondarily block the second encapsulation layer 1672 flowing to the outer periphery of the first dam D1. Accordingly, the first dam D1 and the second dam D2 may more effectively block the second encapsulation layer 1672 from being exposed to the outside of the display device 100 or invading the pad area PA.

The at least one dam D1 or D2 may be formed simultaneously with the planarization film 1650 or the bank 1660, and may be formed of the same material as the planarization film 1650 or the bank 1660. In this case, the at least one dam D1 or D2 may be formed of an organic material such as an acrylic resin, an epoxy resin, a phenolic resin, a polyamide resin, a polyimide resin, or the like.

The fourth trace line TL4 may be formed to extend from the top of the encapsulation layer 200 to an upper portion of the at least one dam D1 and D2, and may be electrically connected to the first connection pattern 1640a disposed thereunder by the touch contact hole TCT, which is a contact hole of the touch interlayer insulation film 1020. Accordingly, the fourth trace line TL4 may not be disposed in the bending area BA.

The fourth trace line TL4 may be electrically connected to the fourth pad PD4 in the pad area PA through the first connection pattern 1640a, the second connection pattern 1620a, and the third connection pattern 1641a. Here, the touch driving circuit 160 may be directly or indirectly connected to the fourth pad PD4.

The first connection pattern 1640a and the third connection pattern 1641a may include the same material as the source-drain electrode of the first transistor T1. The second connection pattern 1620a may include the same material as the gate electrode or the gate line GL of the first transistor T1.

A bending film 1651 may be disposed on a portion of the third connection pattern 1641a, and a pattern protective film 1652 may be disposed on another portion of the third connection pattern 1641a.

The bending film 1651 may be disposed in the bending area BA, may be disposed between the dams D1 and D2 and the pad PD4, and may be disposed to cover an upper portion of a portion of the third connection pattern 1641a. The bending film 1651 may prevent and protect the third connection pattern 1641a from being exposed to the outside in the bending area BA in which the substrate 111 is bent. Further, the bending film 1651 may be provided with an open hole OH through which an upper portion thereof is exposed. In other words, the open hole OH may be formed by removing inorganic films (e.g., the first encapsulation layer 1671, the third encapsulation layer 1673, and the touch interlayer insulation film 1020) that may be disposed on the bending film 1651. When the inorganic film is disposed on the bending film 1651, when the bending area BA is bent, a crack may occur in the inorganic film, and moisture or the like may penetrate the inorganic film in which the crack occurs. Thus, the inorganic films provided on the bending film 1651 are removed.

The pattern protective film 1652 may be disposed to surround an end of the third connection pattern 1641*a*. The pattern protective film 1652 may protect an end of the third connection pattern 1641*a* disposed at an edge of the first non-display area NDA1.

The bending film 1651 and the pattern protective film 1652 may be disposed on the same layer as the planarization film 1650 and may be formed of the same material.

For example, the planarization film 1650, the bending film 1651, and the pattern protection film 1652 may be formed of an organic film such as an acrylic resin, an epoxy resin, a phenolic resin, a polyamide resin, a polyimide resin, or the like.

In the pad area PA, the fourth pad PD4 may be electrically connected to the third connection pattern 1641*a* through a pad contact hole PCT penetrating the first encapsulation layer 1671, the third encapsulation layer 1673, and the touch interlayer insulation film 1020.

Hereinafter, a vertical cross-sectional structure of a path through which the fifth sensor electrode SE5 and the fifth pad PD5 are connected through the fifth trace line TL5 is described with reference to FIG. 17. The following description focuses primarily on the differences, with the same content as the vertical cross-sectional structure of FIG. 16 omitted from the description.

Referring to FIG. 17, the fifth sensor electrode SE5 disposed in the display area DA may include a fifth bridge BRG5 electrically connecting the plurality of fifth sub sensor electrodes SUB5*a* and SUB5*b* and the plurality of fifth sub sensor electrodes SUB5*a* and SUB5*b*.

The fifth bridge BRG5 may overlap the fourth sensor electrode SE4.

The plurality of fifth sub sensor electrodes SUB5*a* and SUB5*b* included in the fifth sensor electrode SE5 and the fourth sensor electrode SE4 may be disposed in the sensor metal layer SML. In other words, the plurality of fifth sub sensor electrodes SUB5*a* and SUB5*b* included in the fifth sensor electrode SE5 and the fourth sensor electrode SE4 may include the sensor metal SM.

The fifth bridge BRG5 may be disposed in the bridge metal layer BML. In other words, the fifth bridge BRG5 may be formed of a bridge metal BM.

The fifth trace line TL5 electrically connected to one (e.g., SUB5*a*) of the plurality of fifth sub sensor electrodes SUB5*a* and SUB5*b* included in the fifth sensor electrode SE5 may be disposed in the bridge metal layer BML. In other words, the fifth trace line TL5 may be formed of a bridge metal BM.

The fifth trace line TL5 may descend along the first inclined surface SLP1 of the encapsulation layer 200 and extend to the pad area PA.

The fifth trace line TL5 may be formed to extend from the top of the encapsulation layer 200 to an upper portion of the at least one dam D1 and D2, and may be electrically connected to the fourth connection pattern 1640*b* disposed thereunder by the touch contact hole TCT, which is a contact hole of the touch interlayer insulation film 1020. Accordingly, the fifth trace line TL5 may not be disposed in the bending area BA.

The fifth trace line TL5 may be electrically connected to the fifth pad PD5 in the pad area PA through the fourth connection pattern 1640*b*, the fifth connection pattern 1620*b*, and the sixth connection pattern 1641*b*. Here, the touch driving circuit 160 may be directly or indirectly connected to the fifth pad PD5.

The fourth connection pattern 1640*b* and the sixth connection pattern 1641*b* may include the same material as the source-drain electrode of the first transistor T1. The fifth connection pattern 1620*b* may include the same material as the gate electrode or the gate line GL of the first transistor T1.

Referring to FIG. 17, the touch protective film 1030 may be disposed on the sensor electrodes SE including the fourth sensor electrode SE4 and the fifth sensor electrode SE5. The touch protective film 1030 may protect the touch sensor and stabilize the characteristics of the display device 100 by blocking a harmful environment from the outside. Further, the touch protective film 1030 may be disposed between the transmission sensor electrode (e.g., the fourth sensor electrode SE4) and the reception sensor electrode (e.g., the fifth sensor electrode SE5) as well as on the sensor electrodes SE including the fourth sensor electrode SE4 and the fifth sensor electrode SE5. Accordingly, the transmission sensor electrode (e.g., the fourth sensor electrode SE4) may be insulated from the reception sensor electrode (e.g., the fifth sensor electrode SE5) by the touch protective film 1030.

A vertical structure for an area including the second non-display area NDA2 and the fourth non-display area NDA4 and a portion of the display area DA adjacent thereto is described below with reference to FIG. 18. To that end, a vertical cross-sectional structure of an area where the first sensor electrode SE1 and the first trace line TL1 are connected is described as an example. The following description focuses primarily on the differences, with the same content as the vertical cross-sectional structure of FIG. 16 omitted from the description.

Referring to FIG. 18, the second non-display area NDA2 and the fourth non-display area NDA4 may not include a bending area BA and a pad area PA. Accordingly, the sizes of the second non-display area NDA2 and the fourth non-display area NDA4 may be reduced.

Further, the trace line TL is not disposed in the second non-display area NDA2 and the fourth non-display area NDA4 of the display panel 110 according to embodiments of the disclosure. Accordingly, an extremely narrow bezel structure of the display panel 110 may be possible.

Referring to FIG. 18, the first sensor electrode SE1 disposed in the display area DA may include a plurality of first sub sensor electrodes SUB1*a* and SUB1*b* and a first bridge BRG1 electrically connecting the plurality of first sub sensor electrodes SUB1*a* and SUB1*b*. The first bridge BRG1 may overlap the fourth sensor electrode SE4.

The plurality of first sub sensor electrodes SUB1*a* and SUB1*b* included in the first sensor electrode SE1 and the fourth sensor electrode SE4 may be disposed in the sensor metal layer SML. In other words, the plurality of first sub sensor electrodes SUB1*a* and SUB1*b* included in the first sensor electrode SE1 and the fourth sensor electrode SE4 may include the sensor metal SM.

The first bridge BRG1 may be disposed in the bridge metal layer BML. In other words, the first bridge BRG1 may be formed of a bridge metal BM.

The first trace line TL1 electrically connected to one (e.g., SUB1*a*) of the plurality of first sub sensor electrodes SUB1*a* and SUB1*b* included in the first sensor electrode SE1 may be disposed in the bridge metal layer BML. In other words, the first trace line TL1 may be formed of a bridge metal BM.

The first trace line TL1 may extend to the first non-display area NDA1 across the display area DA without bypassing the second non-display area NDA2 and the fourth non-display area NDA4, and may be connected to the first pad P1 in the pad area PA included in the first non-display area NDA1.

Accordingly, the first trace line TL1 may not be disposed on the second inclined surface SLP2 and the fourth inclined surface SLP4 of the encapsulation layer 200, but may be disposed along the first inclined surface SLP1 of the encapsulation layer 200 to extend to the pad area PA.

Referring to FIG. 18, when the first trace line TL1 crosses the display area DA without bypassing the second non-display area NDA2 and the fourth non-display area NDA4, the first trace line TL1 may be disposed to avoid the light emitting area EA of each of the plurality of subpixels SP in the display area DA. In other words, the first trace line TL1 may overlap the bank 1660 without overlapping the light emitting area EA of each of the plurality of subpixels SP. Accordingly, it is possible to design an internal trace structure without deteriorating light emitting performance.

Referring to FIG. 18, the first sensor electrode SE1 electrically connected to the first trace line TL1, as well as the first trace line TL1, may not overlap the light emitting area EA of each of the plurality of subpixels SP, but may overlap the bank 1660.

Embodiments of the disclosure described above are briefly described below.

A display device according to embodiments of the disclosure may comprise a substrate including a display area in which a plurality of subpixels are disposed and a non-display area including a pad area positioned in a first direction from the display area, a first sensor electrode disposed in the display area and extending in a second direction crossing the first direction, a second sensor electrode disposed in the display area and extending in the second direction, a first pad disposed in the pad area, a second pad disposed in the pad area, a first trace line electrically connecting the first sensor electrode and the first pad and a second trace line electrically connecting the second sensor electrode and the second pad.

The second sensor electrode may be positioned closer to the pad area than the first sensor electrode.

The first trace line may overlap the second sensor electrode, and the second trace line may include a first meandering portion.

The first trace line and the second trace line may be electrically connected, across the display area in the first direction, to the first pad and the second pad in the pad area.

The first trace line may include no meandering portion or may include a meandering portion shorter than the first meandering portion of the second trace line.

The second sensor electrode may have a load value corresponding to the load value of the first sensor electrode by the first meandering portion of the second trace line.

The first meandering portion may be disposed in an area occupied by the second sensor electrode.

The display device according to embodiments of the disclosure may further comprise a third sensor electrode disposed in the display area and extending in the second direction, a third pad disposed in the pad area, and a third trace line electrically connecting the third sensor electrode and the third pad.

The third sensor electrode may be positioned closer to the pad area than the second sensor electrode.

The first trace line and the second trace line each may overlap the third sensor electrode, and the third trace line may include a second meandering portion.

The second meandering portion may be longer than the first meandering portion.

The first sensor electrode may include two first sub sensor electrodes arranged in the second direction and a first bridge electrically connecting the two first sub sensor electrodes.

The second sensor electrode may include two second sub sensor electrodes arranged in the second direction and a second bridge electrically connecting the two second sub sensor electrodes.

The display device according to embodiments of the disclosure may further comprise a fourth sensor electrode disposed to pass between the two first sub sensor electrodes and between the two second sub sensor electrodes and overlapping the first bridge and the second bridge, a fourth pad disposed in the pad area, and a fourth trace line electrically connecting the fourth sensor electrode and the fourth pad.

The first meandering portion may overlap the fourth sensor electrode.

The two first sub sensor electrodes, the two second sub sensor electrodes, and the fourth sensor electrode may be disposed in a sensor metal layer.

The first bridge and the second bridge may be disposed in a bridge metal layer which is a metal layer different from the sensor metal layer.

The first trace line and the second trace line may be disposed in the bridge metal layer in the display area.

The fourth trace line may include a sensor metal or a bridge metal. In other words, the fourth trace line may be disposed in the sensor metal layer or the bridge metal layer.

In the first non-display area, the fourth trace line may cross, or may not cross, the first trace line and the second trace line.

When the fourth trace line crosses the first trace line and the second trace line in the first non-display area, the fourth trace line may be disposed in a metal layer (e.g., the sensor metal layer) different from the bridge metal layer.

When the fourth trace line does not cross the first trace line and the second trace line in the first non-display area, the fourth trace line may be disposed in any metal layer (e.g., the bridge metal layer or the sensor metal layer).

The two first sub sensor electrodes included in the first sensor electrode, the two second sub sensor electrodes included in the second sensor electrode, and the fourth sensor electrode each may include a mesh-shaped sensor metal.

The two first sub sensor electrodes included in the first sensor electrode, the two second sub sensor electrodes included in the second sensor electrode, and the fourth sensor electrode each may have a comb tooth shape.

The first bridge and the second bridge may include a bridge metal positioned in a metal layer different from the sensor metal.

The first bridge and the second bridge may be disposed to be bent or curved along the mesh-shaped sensor metal of the fourth sensor electrode.

In the display area, the second trace line may be electrically separated from the first sensor electrode and may overlap the first sensor electrode.

The display device according to embodiments of the disclosure may further comprise a fourth sensor electrode disposed in the display area and extending in the first direction, a fifth sensor electrode disposed in the display area and extending in the second direction, a fourth pad disposed in the pad area, a fifth pad disposed in the pad area, a fourth trace line electrically connecting the fourth sensor electrode and the fourth pad, and a fifth trace line electrically connecting the fifth sensor electrode and the fifth pad.

The fifth sensor electrode may be positioned closer to the pad area than the first sensor electrode and the second sensor electrode.

In the display area, the first trace line and the second trace line each may be electrically separated from the fifth sensor electrode and may overlap the fifth sensor electrode.

The fourth sensor electrode may cross the first sensor electrode, the second sensor electrode, and the fifth sensor electrode.

The fourth sensor electrode may be disposed between the first trace line and the fifth trace line.

The first pad, the second pad, the third pad, and the fifth pad may be reception pads, and the fourth pad may be a transmission pad. Alternatively, the first pad, the second pad, the third pad, and the fifth pad may be transmission pads, and the fourth pad may be a reception pad.

As an example, the reception pads may be disposed to be gathered, and the transmission pads may be disposed to be gathered. In this case, the fifth pad may be disposed between the first pad and the fourth pad. The fifth trace line may cross the fourth trace line. The fifth trace line may be positioned in a metal layer different from the fourth trace line.

As another example, the reception pads and the transmission pads may be mixed and disposed. In this case, the fourth pad may be disposed between the first pad and the fifth pad. The fifth trace line may not cross the fourth trace line. The fifth trace line may be positioned in a metal layer identical to or different from the fourth trace line.

The number of first trace lines connected to the first sensor electrode may be larger than the number of fifth trace lines connected to the fifth sensor electrode.

The first sensor electrode, the second sensor electrode, the third sensor electrode, and the fifth sensor electrode may be disposed parallel to each other. The fourth sensor electrode may cross the first sensor electrode, the second sensor electrode, the third sensor electrode, and the fifth sensor electrode.

When the fourth sensor electrode is a transmission sensor electrode and the first sensor electrode, the second sensor electrode, the third sensor electrode, and the fifth sensor electrode are reception electrodes, the fourth sensor electrode may be supplied with a signal (touch driving signal for touch sensing) whose voltage level is varied, from a circuit.

When the first sensor electrode, the second sensor electrode, the third sensor electrode, and the fifth sensor electrode are transmission electrodes, and the fourth sensor electrode is a reception sensor electrode, each of the first sensor electrode, the second sensor electrode, the third sensor electrode, and the fifth sensor electrode may be supplied with a signal (touch driving signal for touch sensing) whose voltage level is varied, from the circuit.

A display panel according to embodiments of the disclosure may comprise a substrate including a display area in which a plurality of subpixels are disposed and a non-display area including a pad area positioned in a first direction from the display area, a light emitting element disposed on the substrate positioned in the display area, an encapsulation layer disposed on the light emitting element, first to third sensor electrodes positioned in the display area, disposed on the encapsulation layer, and each extending in a second direction crossing the first direction, a fourth sensor electrode positioned in the display area, disposed on the encapsulation layer, and crossing the first to third sensor electrodes, first to fourth pads disposed in the pad area, a first trace line electrically connecting the first sensor electrode and the first pad and electrically connected to the first pad across the display area in the first direction, a second trace line electrically connecting the second sensor electrode and the second pad and electrically connected to the second pad across the display area in the first direction, a third trace line electrically connecting the third sensor electrode and the third pad and electrically connected to the third pad across the display area in the first direction, and a fourth trace line electrically connecting the fourth sensor electrode and the fourth pad.

The encapsulation layer may include a first inclined surface positioned outside in the first direction with respect to a center, a second inclined surface positioned outside in the second direction crossing the first direction with respect to the center, a third inclined surface positioned outside in a direction opposite to the first direction with respect to the center, and a fourth inclined surface positioned outside in a direction opposite to the second direction with respect to the center.

The first inclined surface, the second inclined surface, the third inclined surface, and the fourth inclined surface may be positioned in the non-display area.

No metal may be disposed on the second inclined surface and the fourth inclined surface, and the first trace line may pass on the first inclined surface.

The second sensor electrode may be positioned closer to the pad area than the first sensor electrode. The first trace line may overlap the second sensor electrode, and the second trace line may include a first meandering portion.

The first meandering portion may be disposed in an area occupied by the second sensor electrode. The first meandering portion may overlap the second sensor electrode.

According to embodiments of the disclosure described above, there may be provided a display device and a display panel having a narrow bezel.

According to an embodiment of the disclosure, there may be provided a display device and a display panel having a touch sensor structure that allows for a narrow bezel.

According to an embodiment of the disclosure, there may be provided a display device and a display panel including a touch sensor that may provide high touch sensitivity while having a narrow bezel. According to an embodiment of the disclosure, there may be provided a display device and a display panel having a touch sensor stack structure suitable for reducing the bezel size and increasing touch sensitivity.

According to an embodiment of the disclosure, there may be provided a display device and a display panel including a touch sensor that may reduce noise between sensor electrodes.

According to embodiments of the disclosure, as the bezel size is significantly reduced, the use of materials corresponding to the reduced bezel size may be reduced. This may help reduce the weight of the display device.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments.

What is claimed is:
1. A display device, comprising:
a substrate comprising a display area including a plurality of subpixels and a non-display area including a pad area spaced apart from the display area in a first direction;

first to third sensor electrodes arranged in the display area such that the second sensor electrode is closer to the pad area than the first sensor electrode, each of the first to third sensor electrodes extending in a second direction that crosses the first direction;
a fourth sensor electrode in the display area, the fourth sensor electrode extending along the first direction such that the fourth sensor electrode crosses the first to third sensor electrodes;
first to fourth pads in the pad area;
a first trace line electrically connecting the first sensor electrode and the first pad, the first trace line overlapping the second sensor electrode;
a second trace line electrically connecting the second sensor electrode and the second pad, the second trace line including a first meandering portion having at least one part that extends in the first direction and at least one part extends in the second direction in the display area;
a third trace line electrically connecting the third sensor electrode and the third pad; and
a fourth trace line electrically connecting the fourth sensor electrode and the fourth pad.

2. The display device of claim 1, wherein the first trace line is electrically connected to the first pad and extends across the display area in the first direction and the second trace line is electrically connected to the second pad and extends across the display area in the first direction.

3. The display device of claim 1, wherein the first trace line extends across the display area in the first direction without extending in the second direction in the display area or includes a meandering portion that is shorter than the first meandering portion, the meandering portion of the first trace line having at least one part that extends in the first direction and at least one part extends in the second direction in the display area.

4. The display device of claim 1, wherein the first meandering portion overlaps the second sensor electrode.

5. The display device of claim 1, wherein the third sensor electrode is closer to the pad area than the second sensor electrode such that the first trace line and the second trace line each overlap the third sensor electrode, and the third trace line includes a second meandering portion having at least one part that extends in the first direction and at least one part extends in the second direction over the third sensor electrode in the display area.

6. The display device of claim 1, wherein the first sensor electrode includes two first sub sensor electrodes arranged in the second direction and a first bridge that electrically connects the two first sub sensor electrodes,
wherein the second sensor electrode includes two second sub sensor electrodes arranged in the second direction and a second bridge that electrically connects the two second sub sensor electrodes, and
wherein a first portion of the fourth sensor electrode is between the two first sub sensor electrodes and overlaps the first bridge and a second portion of the fourth sensor electrode is between the two second sub sensor electrodes and overlaps the second bridge.

7. The display device of claim 6, wherein the first meandering portion overlaps the fourth sensor electrode.

8. The display device of claim 6, wherein the two first sub sensor electrodes, the two second sub sensor electrodes, and the fourth sensor electrode are in a sensor metal layer,
wherein the first bridge, the second bridge, the first trace line, and the second trace line are in a bridge metal layer that is different from the sensor metal layer, and
wherein the fourth trace line is in the sensor metal layer or the bridge metal layer.

9. The display device of claim 6, wherein the two first sub sensor electrodes included in the first sensor electrode, the two second sub sensor electrodes included in the second sensor electrode, and the fourth sensor electrode each include a mesh-shaped sensor metal,
wherein the first bridge and the second bridge include a bridge metal that is in a different layer from the mesh-shaped sensor metal, and
wherein the first bridge and the second bridge are bent or curved along the mesh-shaped sensor metal of the fourth sensor electrode.

10. The display device of claim 1, wherein the second trace line overlaps the first sensor electrode.

11. The display device of claim 1, further comprising:
a fifth sensor electrode arranged in the display area such that the fifth sensor electrode is closer to the pad area than the first sensor electrode, the second sensor electrode, and the third sensor electrode, the fifth sensor electrode extending in the second direction;
a fifth pad in the pad area; and
a fifth trace line electrically connecting the fifth sensor electrode and the fifth pad,
wherein the first trace line, the second trace line, and the third trace line each overlap the fifth sensor electrode.

12. The display device of claim 11, wherein a number of first trace lines connected to the first sensor electrode is greater than a number of fifth trace lines connected to the fifth sensor electrode.

13. A display panel, comprising:
a substrate comprising a display area including a plurality of subpixels and a non-display area including a pad area spaced apart from the display area in a first direction;
a first sensor electrode in the display area, the first sensor electrode extending in a second direction that crosses the first direction;
a second sensor electrode in the display area, the second sensor electrode extending in the second direction and is closer to the pad area than the first sensor electrode;
a first trace line extending from the pad area to the first sensor electrode such that the first trace line overlaps the first sensor electrode and the second sensor electrode; and
a second trace line extending from the pad area to the second sensor electrode such that the second trace line overlaps the second sensor electrode without overlapping the first sensor electrode,
wherein a total length of the second trace line is substantially a same as a total length of the first trace line.

14. The display panel of claim 13, wherein the second trace line includes a meandering portion having at least one part that extends in the first direction and at least one part extends in the second direction in the display area.

15. The display panel of claim 14, wherein the meandering portion overlaps the second sensor electrode.

16. The display panel of claim 14, wherein the first trace line extends in the first direction in the display area without extending in the second direction in the display area.

17. The display panel of claim 13, further comprising:
a third sensor electrode in the display area, the third sensor electrode extending along the first direction such that the third sensor electrode crosses the first sensor electrode and the second sensor electrode;
a third trace line connected to the third sensor electrode;

a first pad in the pad area, the first pad connected to the first trace line that electrically connects the first pad to the first sensor electrode;

a second pad in the pad area, the second pad connected to the second trace line that electrically connects the second pad to the second sensor electrode; and a third pad in the pad area, the third pad connected to the third trace line that electrically connects the third pad to the third sensor electrode.

18. The display panel of claim 13, further comprising:

an encapsulation layer that extends from the display area to the non-display area, the encapsulation layer having a plurality of inclined surfaces in the non-display area, wherein the first trace line and the second trace line overlap an inclined surface of the plurality of inclined surfaces that is between the display area and the pad area without overlapping remaining inclined surfaces from the plurality of inclined surfaces.

* * * * *